(12) United States Patent
Park et al.

(10) Patent No.: US 11,763,261 B2
(45) Date of Patent: Sep. 19, 2023

(54) TASK MULTI-ASSIGNMENT METHOD, APPARATUS, AND COMPUTER PROGRAM USING TIER DATA STRUCTURE OF CROWDSOURCING-BASED PROJECT

(71) Applicant: CROWDWORKS INC., Seoul (KR)

(72) Inventors: Min Woo Park, Gyeonggi-do (KR); Hyung Joon Seo, Gyeonggi-do (KR)

(73) Assignee: CROWDWORKS INC., Seoul (KR)

( * ) Notice: Subject to any disclaimer, the term of this patent is extended or adjusted under 35 U.S.C. 154(b) by 285 days.

(21) Appl. No.: 17/389,349

(22) Filed: Jul. 30, 2021

(65) Prior Publication Data

US 2022/0019974 A1 Jan. 20, 2022

Related U.S. Application Data

(63) Continuation of application No. PCT/KR2021/007975, filed on Jun. 24, 2021.

(30) Foreign Application Priority Data

Jul. 20, 2020 (KR) .................. 10-2020-0089804

(51) Int. Cl.
*G06Q 10/10* (2023.01)
*G06Q 10/0631* (2023.01)
*G06Q 10/0639* (2023.01)
*G06N 20/00* (2019.01)

(52) U.S. Cl.
CPC ..... *G06Q 10/103* (2013.01); *G06Q 10/06316* (2013.01); *G06Q 10/06395* (2013.01); *G06Q 10/063118* (2013.01); *G06N 20/00* (2019.01)

(58) Field of Classification Search
CPC .......................................... G06Q 10/00–50/00
(Continued)

(56) References Cited

U.S. PATENT DOCUMENTS 11,126,938 B2 * 9/2021 Dyer ................. G10L 15/18
2006/0168217 A1 * 7/2006 Anand ................ H04L 67/60
709/240

(Continued)

FOREIGN PATENT DOCUMENTS

| JP | 11-85866 | 3/1999 |
|---|---|---|
| JP | 2003-160210 | 6/2003 |
| KR | 10-2014-0095956 | 8/2014 |

OTHER PUBLICATIONS

Marcus, Adam, et al. "Crowdsourced databases: Query processing with people." Cidr, 2011. (Year: 2011).*

(Continued)

*Primary Examiner* — Alan S Miller
(74) *Attorney, Agent, or Firm* — Studebaker & Brackett PC

(57) ABSTRACT

A task multi-assignment method using a tier data structure of a crowdsourcing-based project, the method being a task assignment method using a tier data structure of a crowdsourcing-based project of a multi-assignment method of duplicately assigning each task to a plurality of n different workers, includes: configuring an assignment tier storage including a queue into which task data corresponding to a task that is not assigned to the worker is enqueued, and one or more $j^{th}$ stacks into which task data corresponding to tasks that are each assigned j times (wherein j is a natural number less than n) are pushed; and assigning a task of the project to a worker (hereinafter, referred to as a target worker) who requests task assignment and requesting the target worker to perform the task, by using the assignment tier storage.

17 Claims, 21 Drawing Sheets

(58) Field of Classification Search
USPC .............................................. 705/7.11–7.42
See application file for complete search history.

(56) References Cited

U.S. PATENT DOCUMENTS

| | | | |
|---|---|---|---|
| 2012/0265573 A1* | 10/2012 | Van Pelt .......... | G06Q 10/06311 |
| | | | 705/7.14 |
| 2013/0197954 A1* | 8/2013 | Yankelevich .......... | G06Q 30/02 |
| | | | 705/7.13 |
| 2013/0317871 A1* | 11/2013 | Kulkarni ........ | G06Q 10/063112 |
| | | | 705/7.14 |
| 2017/0061356 A1* | 3/2017 | Haas ................ | G06Q 10/06316 |
| 2017/0061357 A1* | 3/2017 | Dubey ............ | G06Q 10/063112 |

OTHER PUBLICATIONS

Ahmad, Salman, et al. "The jabberwocky programming environment for structured social computing." Proceedings of the 24th annual ACM symposium on User interface software and technology. 2011. (Year: 2011).*

Rahman, Mohammad Masudur, and Chanchal Roy. "Effective reformulation of query for code search using crowdsourced knowledge and extra-large data analytics." 2018 IEEE International Conference on Software Maintenance and Evolution (ICSME). IEEE, 2018. (Year: 2018).*

Notice of Allowance dated Nov. 5, 2020 for Korean Patent Application No. 10- 2020-0089804 and its English translation provided by Applicant's foreign counsel.

* cited by examiner

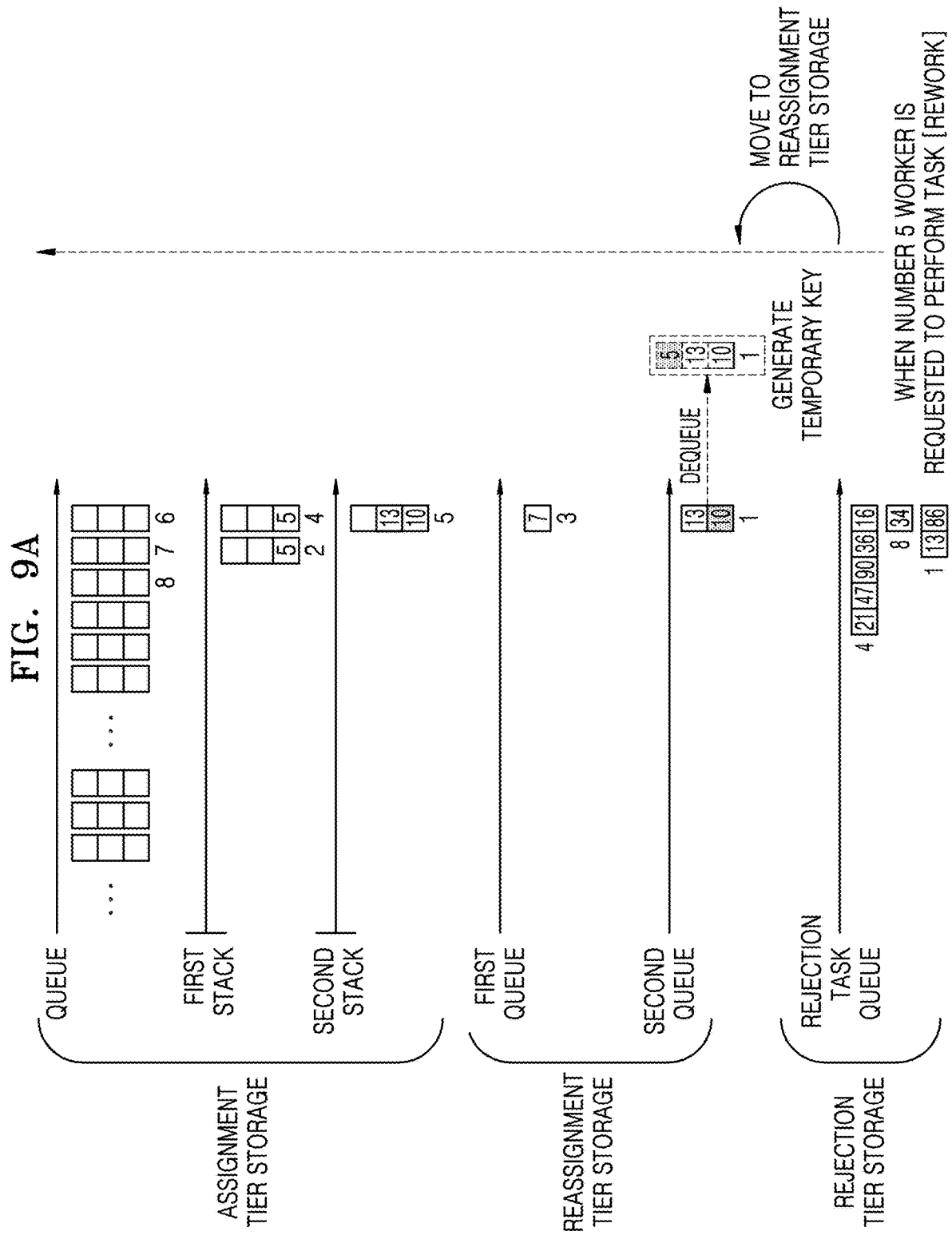

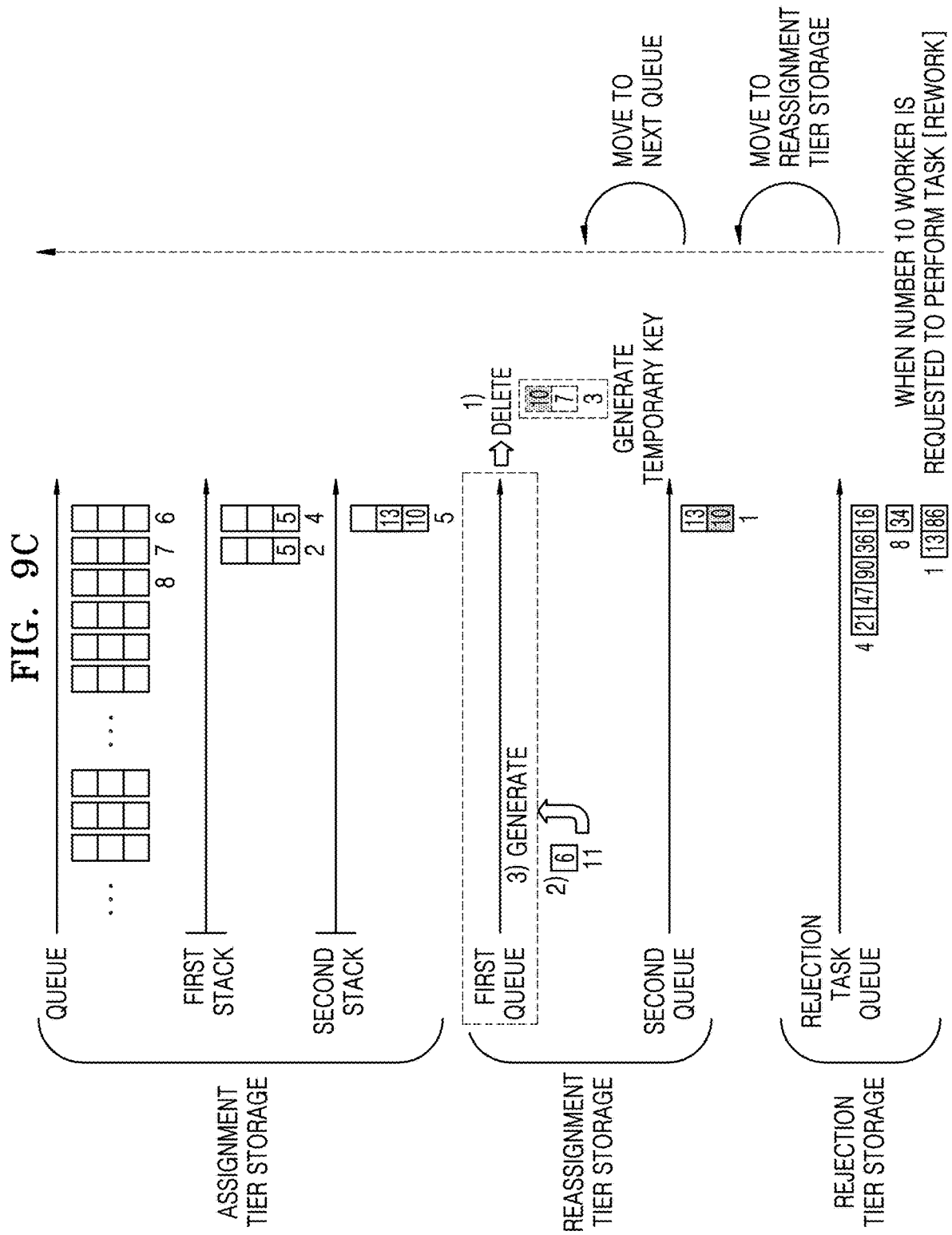

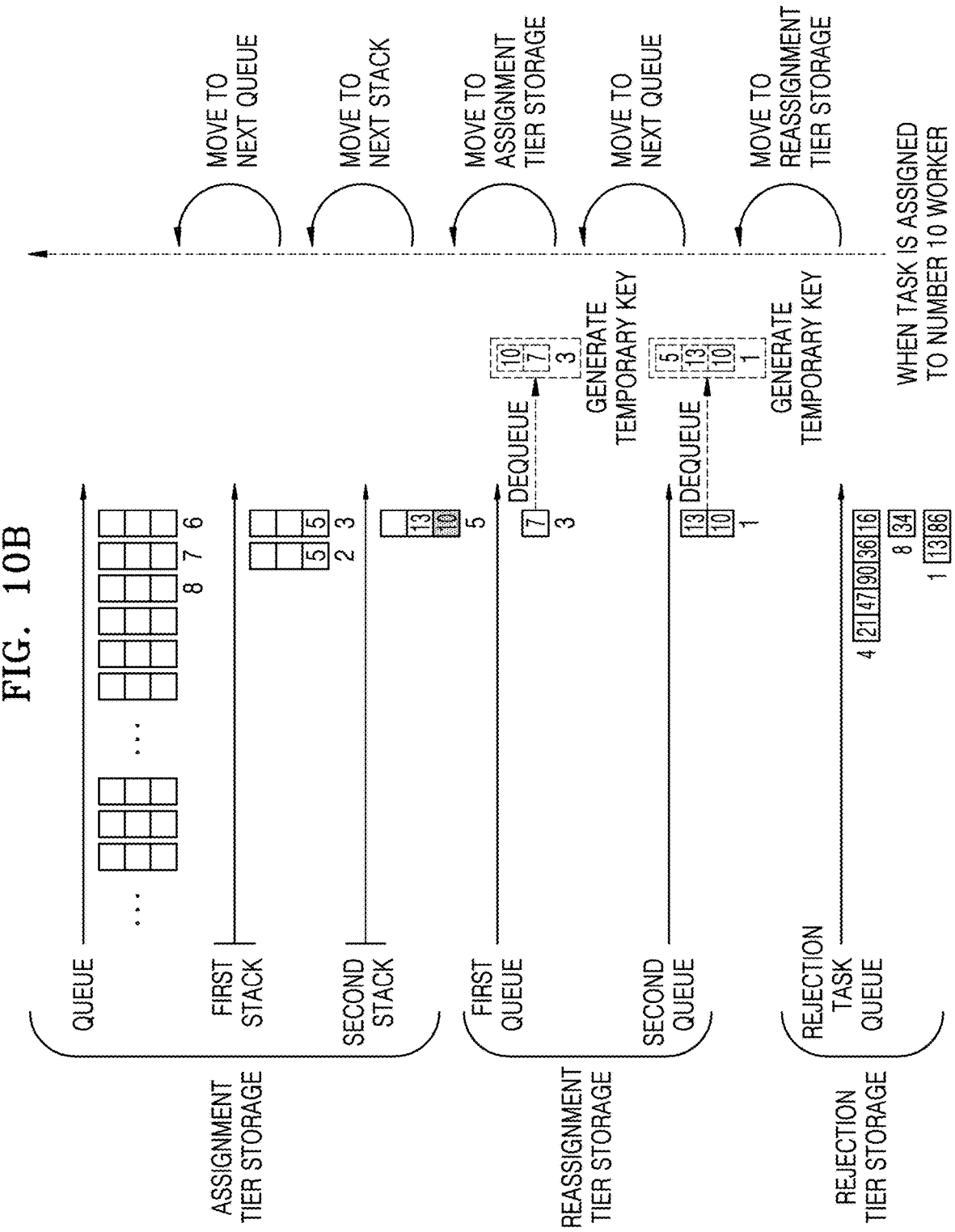

TASK MULTI-ASSIGNMENT METHOD, APPARATUS, AND COMPUTER PROGRAM USING TIER DATA STRUCTURE OF CROWDSOURCING-BASED PROJECT

CROSS-REFERENCE TO RELATED APPLICATIONS

The present application is a continuation of International Patent Application No. PCT/KR2021/007975 filed on Jun. 24, 2021, which claims the priority to Korean Patent Application No. 10-2020-0089804 filed in the Korean Intellectual Office on Jul. 20, 2020, the entire contents of which are incorporated herein by reference.

TECHNICAL FIELD

One or more embodiments relate to a task multi-assignment method using a tier data structure of a crowdsourcing-based project.

BACKGROUND ART

Recently, more and more companies have been collecting and processing large amounts of data based on crowdsourcing that engages the general public in some processes of company activities. In other words, a company opens one project and allows the general public, i.e., workers, to participate in the corresponding project to collect needed information via the results of work completed by the workers.

Here, the company assigns an inspector the results of work completed by a worker and requests the inspector to perform inspection work, to collect more reliable information.

In detail, when one project is opened, a plurality of tasks are assigned to each of a plurality of workers. Each worker performs a plurality of assigned tasks and provides work results of the tasks. Each of a plurality of inspectors is assigned a plurality of inspection works for the work results, and each inspector performs the assigned inspection works.

A particular project needs a task multi-assignment method of assigning the same task to a plurality of different workers.

In such a task multi-assignment method, one task needs to be assigned to a plurality of workers, and thus, the number of pieces of data that may be simultaneously controlled is limited.

Also, a local memory dependent on a web application server is used, and thus, the service may not be expanded or changed according to the increase in users.

In addition, as a difference in work speed between workers increases, many sources are consumed in a scanning process for task assignment, thereby significantly decreasing the speed.

DESCRIPTION OF EMBODIMENTS

Technical Problem

One or more embodiments include a task multi-assignment method using a tier data structure of a crowdsourcing-based project, capable of quickly scanning an assignable task via a single scan and assigning the task to a worker without a load in a scanning process for task multi-assignment by inquiring and managing a key-value pair of each data item included in a queue or stack area in an assignment tier storage, a reassignment tier storage, and a rejection tier storage.

The problems to be solved by the disclosure are not limited to the problems described above, and other problems may be present.

Solution to Problem

According to one or more embodiments, a task multi-assignment method using a tier data structure of a crowdsourcing-based project, the method being a task assignment method using a tier data structure of a crowdsourcing-based project (hereinafter, referred to as a project) of a multi-assignment method of duplicately assigning each task to a plurality of n different workers (wherein n is a natural number greater than 1), includes: configuring an assignment tier storage including a queue into which task data corresponding to a task that is not assigned to the worker is enqueued, and one or more $j^{th}$ stacks into which task data corresponding to tasks that are each assigned j times (wherein j is a natural number less than n) is pushed; and assigning a task of the project to a worker (hereinafter, referred to as a target worker) who requests task assignment and requesting the target worker to perform the task, by using the assignment tier storage. The task data may include a key-value pair including an identifier of the task and n pieces of multi-assignment data, the multi-assignment data may include a key-value pair including an identifier of a worker to which the task is assigned, and a multi-assignment index, the assigning the task of the project and requesting to perform the task may include extracting task data at the top of a current stack in a descending order with respect to the one or more $j^{th}$ stacks, identifying whether or not the task data at the top of the current stack includes an identifier of the target worker, when the task data at the top of the current stack does not include the identifier of the target worker, popping the task data from the current stack, assigning a task corresponding to the task data popped from the current stack to the target worker, requesting the target worker to perform the task, inputting the identifier of the target worker into the multi-assignment data of the task data popped from the current stack, and pushing the task data popped from the current stack into a previous stack.

The assigning the task of the project and requesting to perform the task may include, when the current stack is empty, the current stack is deleted, or the task data at the top of the current stack includes the identifier of the target worker, moving to a next stack.

The assigning the task of the project and requesting to perform the task may include, when a first stack is empty, the first stack is deleted, or the task data at the top of the first stack includes the identifier of the target worker, moving to the queue, dequeuing the task data from the queue, assigning a task corresponding to the task data dequeued from the queue to the target worker, requesting the target worker to perform the task, inputting the identifier of the target worker into the multi-assignment data of the task data dequeued from the queue, and pushing the task data dequeued from the queue into the first stack.

The assigning the task of the project and requesting to perform the task may include, when the current stack is empty after the task data is popped from the current stack, deleting the current stack, when the previous stack is deleted before the task data popped from the current stack is pushed into the previous stack, re-generating the previous stack, and, when the first stack is deleted before the task data dequeued from the queue is pushed into the first stack, re-generating the first stack.

The assigning the task of the project and requesting to perform the task may include, when the current stack is an $n-1^{th}$ stack, popping the task data from the $n-1^{th}$ stack, assigning a task corresponding to the task data popped from the $n-1^{th}$ stack to the target worker, requesting the target worker to perform the task, and dropping the task data popped from the $n-1^{th}$ stack.

The task multi-assignment method may further include: configuring a rejection tier storage including one or more pieces of rejection data corresponding to a worker who has a work result (hereinafter, referred to as a rejected work result) that is rejected according to an inspection result; and, when the target worker has the rejected work result, requesting the target worker to perform rework by using the rejection tier storage. The rejection data may include a key-value pair including an identifier of a worker who has the rejected work result, and a rejection task queue, an identifier of a task corresponding to the rejected work result may be enqueued into the rejection task queue, the requesting to perform the rework may include, when a rejected work result occurs, enqueuing an identifier of a task corresponding to the rejected work result into a rejection task queue corresponding to a worker who inputs the rejected work result, identifying whether or not the one or more pieces of rejection data of the rejection tier storage include the identifier of the target worker, and when the one or more pieces of rejection data of the rejection tier storage include the identifier of the target worker, dequeuing an identifier of a task corresponding to the rejected work result from a rejection task queue corresponding to the target worker, and requesting the target worker to perform rework for a task corresponding to the dequeued identifier of the task.

The assigning the task of the project and requesting to perform the task may include, when the one or more pieces of rejection data of the rejection tier storage do not include the identifier of the target worker, assigning a task of the project to the target worker and requesting the target worker to perform the task, by using the assignment tier storage.

The task multi-assignment method may further include: configuring a reassignment tier storage including one or more $k^{th}$ queues enqueued on the basis of a $k^{th}$ number of reassignments (wherein k is a natural number) of reassignment data corresponding to each task (hereinafter, referred to as a reassignment-needing task) to be reassigned to a new worker; and reassigning a task of the project to the target worker and requesting the target worker to perform the task, by using the reassignment tier storage. The reassignment data may include a key-value pair including a set of an identifier of the reassignment-needing task and one or more identifiers of a previous worker to which the reassignment-needing task is assigned, and the reassigning the task of the project and requesting to perform the task may include, when a reassignment-needing task occurs, enqueuing reassignment data corresponding to the reassignment-needing task into the $k^{th}$ queue corresponding to a number of reassignments of the reassignment-needing task, dequeuing reassignment data from a current queue in a descending order with respect to the one or more $k^{th}$ queues, identifying whether or not the reassignment data dequeued from the current queue includes the identifier of the target worker, when the reassignment data dequeued from the current queue does not include the identifier of the target worker, reassigning a task corresponding to the reassignment data dequeued from the current queue to the target worker, requesting the target worker to perform the task, and generating a temporary key including a set of the identifier of the reassignment-needing task of the reassignment data dequeued from the current queue and the one or more identifiers of the previous worker to which the identifier of the target worker is added.

The reassigning the task of the project and requesting to perform the task may include, when the current queue is empty, the current queue is deleted, or the reassignment data dequeued from the current queue includes the identifier of the target worker, moving to a next queue.

The reassigning the task of the project and requesting to perform the task may include, when the current queue is empty after the reassignment data is dequeued from the current queue, deleting the current queue, and, when the $k^{th}$ queue corresponding to a number of reassignments of the reassignment-needing task is deleted before the reassignment data corresponding to the reassignment-needing task is enqueued, re-generating the $k^{th}$ queue.

The reassigning the task of the project and requesting to perform the task may include, when the reassignment-needing task that is reassigned to the target worker needs to be reassigned to a new worker again, enqueuing reassignment data corresponding to a reassignment-needing task that is reassigned to the target worker into the $k^{th}$ queue corresponding to a number of reassignments of the reassignment-needing task that is reassigned to the target worker, by using the temporary key.

The reassigning the task of the project and requesting to perform the task may include, when the current queue is empty or the current queue is deleted, moving to a next queue, and, when reassignment data dequeued from the current queue includes the identifier of the target worker, re-enqueuing the reassignment data dequeued from the current queue into the current queue and moving to the next queue.

The assigning the task of the project and requesting to perform the task may include identifying an identifier of the task of the task data at the top of the current stack, identifying whether or not the temporary key including the identifier of the task of the task data at the top of the current stack includes the identifier of the target worker, when the temporary key including the identifier of the task of the task data at the top of the current stack does not include the identifier of the target worker and the task data at the top of the current stack does not include the identifier of the target worker, popping the task data from the current stack, assigning a task corresponding to the task data popped from the current stack to the target worker, requesting the target worker to perform the task, inputting the identifier of the target worker into the multi-assignment data of the task data popped from the current stack, and pushing the task data popped from the current stack into a previous stack.

The assigning the task of the project and requesting to perform the task may include, when the temporary key including the identifier of the task of the task data at the top of the current stack includes the identifier of the target worker, moving to a next stack.

The assigning the task of the project and requesting to perform the task may include, when the temporary key including the identifier of the task of the task data at the top of the first stack includes the identifier of the target worker, moving to the queue.

The reassigning the task of the project and requesting to perform the task may include, when the one or more pieces of rejection data of the rejection tier storage do not include the identifier of the target worker, reassigning a task of the project to the target worker and requesting the target worker to perform the task, by using the reassignment tier storage.

The assigning the task of the project and requesting to perform the task may include, when the reassignment data dequeued from the current queue of the reassignment tier storage includes the identifier of the target worker, assigning a task of the project to the target worker and requesting the target worker to perform the task, by using the assignment tier storage.

According to one or more embodiments, a task multi-assignment apparatus using a tier data structure of a crowdsourcing-based project, the task multi-assignment apparatus being a task assignment apparatus using a tier data structure of a crowdsourcing-based project (hereinafter, a project) of a multi-assignment method of duplicately assigning each task to a plurality of n different workers (wherein n is a natural number greater than 1), includes: a memory storing a program for multi-assigning a task to the plurality of different workers by using the tier data structure; and a processor controlling an operation associated with the assigning the task of the project, wherein when the program is executed, the processor performs: configuring an assignment tier storage including a queue into which task data corresponding to a task that is not assigned to the worker is enqueued, and one or more $j^{th}$ stacks into which task data corresponding to tasks that are each assigned j times (wherein j is a natural number less than n) is pushed; and assigning a task of the project to a worker (hereinafter, a target worker) who requests task assignment and requesting the target worker to perform the task, by using the assignment tier storage; configuring a rejection tier storage including one or more pieces of rejection data corresponding to a worker who has a work result (hereinafter, a rejected work result) that is rejected according to an inspection result; and, when the target worker has the rejected work result, requesting the target worker to perform rework by using the rejection tier storage, wherein the task data includes a key-value pair including an identifier of the task and n pieces of multi-assignment data, the multi-assignment data includes a key-value pair including an identifier of a worker to which the task is assigned, and a multi-assignment index, the assigning the task of the project and requesting to perform the task includes extracting task data at the top of a current stack in a descending order with respect to the one or more $j^{th}$ stacks, identifying whether or not the task data at the top of the current stack includes an identifier of the target worker, when the task data at the top of the current stack does not include the identifier of the target worker, popping the task data from the current stack, assigning a task corresponding to the task data popped from the current stack to the target worker, requesting the target worker to perform the task, inputting the identifier of the target worker into the multi-assignment data of the task data popped from the current stack, and pushing the task data popped from the current stack into a previous stack, the rejection data includes a key-value pair including an identifier of a worker who has the rejected work result, and a rejection task queue, an identifier of a task corresponding to the rejected work result is enqueued into the rejection task queue, the requesting to perform the rework includes, when a rejected work result occurs, enqueuing an identifier of a task corresponding to the rejected work result into a rejection task queue corresponding to a worker who inputs the rejected work result, identifying whether or not the one or more pieces of rejection data of the rejection tier storage include the identifier of the target worker, and when the one or more pieces of rejection data of the rejection tier storage include the identifier of the target worker, dequeuing an identifier of a task corresponding to the rejected work result from a rejection task queue corresponding to the target worker, and requesting the target worker to perform rework for a task corresponding to the dequeued identifier of the task.

According to one or more embodiments, a computer program stored in a computer-readable recording medium to be combined with a computer to execute a task assignment method using a tier data structure of a crowdsourcing-based project (hereinafter, a project) of a multi-assignment method of duplicately assigning each task to a plurality of n different workers (wherein n is a natural number greater than 1) performs: configuring an assignment tier storage including a queue into which task data corresponding to a task that is not assigned to the worker is enqueued, and one or more $j^{th}$ stacks into which task data corresponding to tasks that are each assigned j times (wherein j is a natural number less than n) is pushed; and assigning a task of the project to a worker (hereinafter, a target worker) who requests task assignment and requesting the target worker to perform the task, by using the assignment tier storage; configuring a rejection tier storage including one or more pieces of rejection data corresponding to a worker who has a work result (hereinafter, a rejected work result) that is rejected according to an inspection result; and, when the target worker has the rejected work result, requesting the target worker to perform rework by using the rejection tier storage, wherein the task data includes a key-value pair including an identifier of the task and n pieces of multi-assignment data, the multi-assignment data includes a key-value pair including an identifier of a worker to which the task is assigned, and a multi-assignment index, the assigning the task of the project and requesting to perform the task includes extracting task data at the top of a current stack in a descending order with respect to the one or more $j^{th}$ stacks, identifying whether or not the task data at the top of the current stack includes an identifier of the target worker, when the task data at the top of the current stack does not include the identifier of the target worker, popping the task data from the current stack, assigning a task corresponding to the task data popped from the current stack to the target worker, requesting the target worker to perform the task, inputting the identifier of the target worker into the multi-assignment data of the task data popped from the current stack, and pushing the task data popped from the current stack into a previous stack, the rejection data includes a key-value pair including an identifier of a worker who has the rejected work result, and a rejection task queue, an identifier of a task corresponding to the rejected work result is enqueued into the rejection task queue, the requesting to perform the rework includes, when a rejected work result occurs, enqueuing an identifier of a task corresponding to the rejected work result into a rejection task queue corresponding to a worker who inputs the rejected work result, identifying whether or not the one or more pieces of rejection data of the rejection tier storage include the identifier of the target worker, and when the one or more pieces of rejection data of the rejection tier storage include the identifier of the target worker, dequeuing an identifier of a task corresponding to the rejected work result from a rejection task queue corresponding to the target worker, and requesting the target worker to perform rework for a task corresponding to the dequeued identifier of the task.

Other detailed matters of the disclosure are included in the description and drawings.

Advantageous Effects of Disclosure

According to the disclosure described above, via flexible expansion and contraction of a stack area for task multi-assignment, in theory, tasks may be assigned without limiting to the number thereof.

Also, a load may not occur in a scanning process for task multi-assignment, and an assignable task may be quickly scanned via a single scan and assigned to a worker.

In addition, concurrency may be secured during task multi-assignment, with a single thread, and a service may be easily expanded according to the increase in the number of users.

Effects of the disclosure are not limited to the effects mentioned above, and other unmentioned effects will be clearly understood by those skilled in the art from the following description.

BRIEF DESCRIPTION OF DRAWINGS

FIGS. 9A through 9C are views illustrating an example of requesting the performance of a task by using a reassignment tier storage.

FIGS. 10A and 10B are views illustrating an example of requesting the performance of a task by using each tier storage.

MODE OF DISCLOSURE

Figure 1:
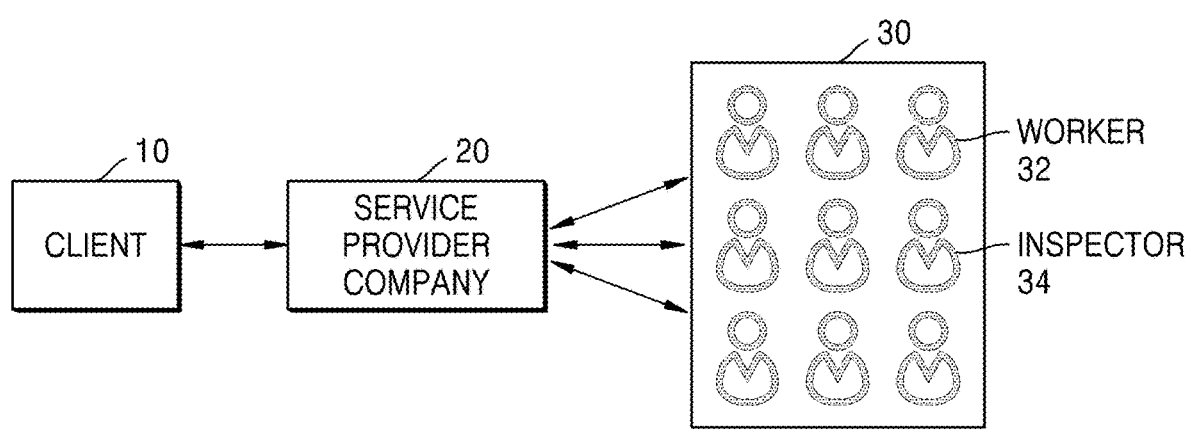
FIG. 1 is a conceptual diagram of a crowdsourcing service according to an embodiment.

Advantages and features of the disclosure, and methods of achieving thereof will become apparent with reference to the embodiments described below in detail in conjunction with the accompanying drawings. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art, and the disclosure is merely defined by the scope of claims.

The terminology used herein is for the purpose of describing the embodiments and is not intended to limit the disclosure. As used herein, the singular forms are intended to include the plural forms as well, unless the context clearly indicates otherwise. The terms "comprises" and/or "comprising" when used in this specification do not preclude the presence or addition of one or more other elements in addition to stated elements. Like reference numerals refer to like elements throughout. As used herein, the term "and/or" includes any and all combinations of one or more of the associated listed items. Although the terms "first," "second," etc. may be used herein to describe various elements or components, these elements or components should not be limited by these terms. These terms are only used to distinguish one element or component from another element or component. Thus, a first element or component discussed below may be termed a second element or component without departing from the scope of example embodiments.

Unless otherwise defined, all terms (including technical and scientific terms) used herein have the same meanings as commonly understood by one of ordinary skill in the art to which example embodiments belong. Terms, such as those defined in commonly used dictionaries, will not be interpreted in an idealized or overly formal sense unless expressly so defined herein.

Hereinafter, one or more embodiments will be described in detail with reference to the accompanying drawings.

FIG. 1 is a conceptual diagram of a crowdsourcing service according to an embodiment.

Referring to FIG. 1, a crowdsourcing service is performed by constituting a client 10, a service provider company 20, and the public 30.

The client 10 refers to a company or individual that commissions a crowdsourcing-based project (hereinafter, referred to as a project).

The client 10 commissions the project, for the collection of source data for the generation of artificial intelligence learning data, data annotation, or the like. Data generated via the project may be used as learning data for any machine learning such as supervised learning, unsupervised learning, or reinforcement learning. The collection of the source data refers to the collection of raw data such as the collection of recorded voice and the collection of photos. The data annotation refers to inputting associated annotation data into source data such as text, photos, and video. For example, the data annotation may include finding an entity in given text, finding a similar sentence, and the like but is not limited thereto. The type of project described above is only an embodiment, and various types of projects may be handled in the disclosure according to the design of a client.

The service provider company 20 refers to a company that provides a crowdsourcing service.

When receiving, from the client 10, a request for a product or service project, the service provider company 20 assigns work on the corresponding project to the public 30 and receives the results of the work from the public 30. The service provider company 20 provides the client 10 with final outputs extracted on the basis of the results of work.

Here, the service provider company 20 provides the client 10 and the public 30 with crowdsourcing services via a crowdsourcing platform (hereinafter, referred to as a platform). In other words, when the service provider company 20 receives a project request from the client 10, the service provider company 20 opens a project on the platform. When the service provider company 20 receives, from the public 30, the results of the work on the opened project, the service provider company 20 may end the corresponding project on the platform, extract final outputs, and provide the extracted final outputs to the client 10.

The public 30 refers to the general public who participates in the project opened on the platform. Here, the public 30 may participate in the project opened on the platform, via an application, website, or the like provided by the service provider company 20.

The public 30 includes a worker 32 and an inspector 34.

The worker 32 determines to participate in a particular project from among a plurality of projects opened on the platform. The worker 32 performs work such as the collection of source data and data annotation, and transmits the same to the platform.

The inspector 34 determines to participate in a particular project from among the plurality of projects opened on the platform. The inspector 34 performs inspection on the results of work performed by the worker 32. The inspector 34 may perform inspection pass processing or rejection processing as the results of the inspection performance, and may input the reasons for the rejections when performing rejection processing. In the cases of inspection passes, reworks and subsequent reinspection are not needed, and thus, inspection passes mean the same as the completion of inspection.

Figure 2:
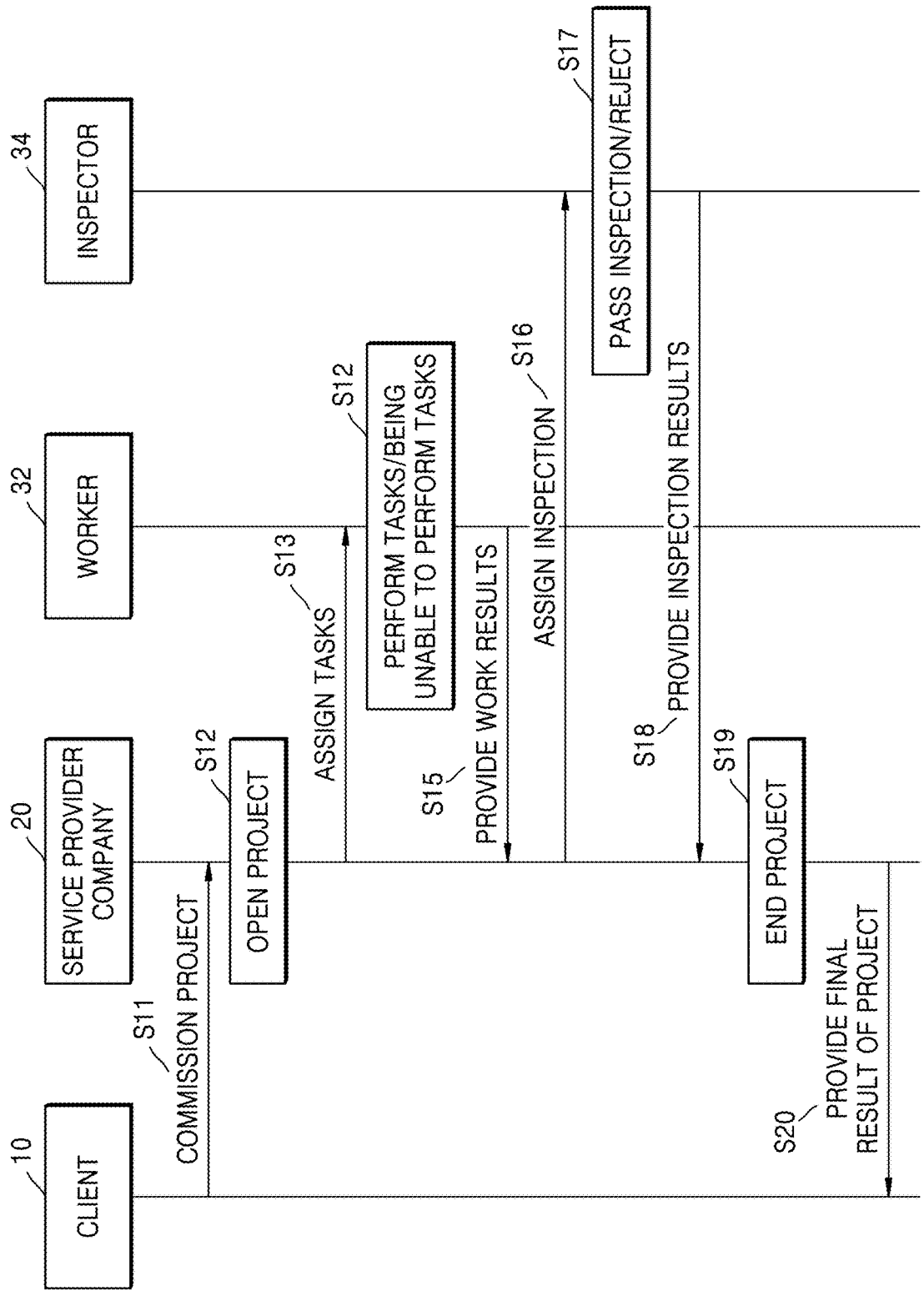
FIG. 2 is a flowchart illustrating a process of a crowdsourcing-based project, according to an embodiment.

FIG. 2 is a flowchart illustrating a process of a crowdsourcing-based project according to an embodiment.

In operation S11, a client 10 commissions one or more projects to a service provider company 20.

In operation S12, the service provider company 20 opens the commissioned projects on a platform. Here, before opening a project, the service provider company 20 may determine a grade of the project by considering a level of difficulty of the corresponding project and the like. In other words, the service provider company 20 may determine to expose the corresponding project to the public 30 having a certain grade or higher, according to the level of difficulty. Accordingly, the reliability of work results of a project may be improved.

In operation S13, the service provider company 20 assigns tasks to a worker 32 having a corresponding grade or higher, according to the grade of the project, and requests to perform the tasks.

In operation S14, the worker 32 performs the assigned tasks. Here, the worker 32 may not perform a task that may not be performed for some reason and input a reason for not being able to perform the task.

In operation S15, the service provider company 20 receives work results from the worker 32 and, in operation S16, assigns inspection work for the corresponding work results to an inspector 34 and requests inspection.

Similarly, according to an embodiment, only appropriate projects from among all projects that are being performed may be exposed to the inspector 34 according to grades or qualification requirements of the inspector 34 that are set according to the levels of difficulty of the projects.

In operation S17, the inspector 34 performs the assigned inspection. Here, the inspector 34 determines an inspection pass when a task is determined as being appropriately performed and processes the task as a rejection when the task is determined, via inspection work, as being incorrectly performed. When processing the rejection, the inspector 34 inputs a reason for the rejection of the task being determined as being incorrectly performed.

In operation S18, the service provider company 20 receives the results of inspection from the inspector 34.

When the results of inspection are inspection passes, the service provider company 20 uses the corresponding work results as valid data and, on the basis of the valid data, extracts final outputs at the end of the project.

When the results of inspection are rejection processing, the service provider company 20 may internally re-perform inspection, or may re-assign tasks to the worker 32 and request to perform rework. Reinspection by an inspector is needed upon rework.

The service provider company 20 terminates the corresponding project in operation S19 when a project period ends or sufficient valid data is secured, and, on the basis of the secured valid data, calculates the final results and provides the final results to the client 10 in operation S20.

Here, before the project ends, the service provider company 20 evaluates the performance results of the worker 32 and the inspector 34, calculates work cost and inspection cost according to the evaluation, and pays the work cost and inspection cost to the worker 32 and the inspector 34.

FIGS. 1 and 2 simply illustrate the client 10, the service provider company 20, the worker 32, and the inspector 34. However, the client 10, the service provider company 20, the worker 32, and the inspector 34 may refer to computer apparatuses or telecommunication devices such as smartphones, tablets, personal digital assistants (PDAs), laptops, desktops, and servers operated by respective participants.

Figure 3:
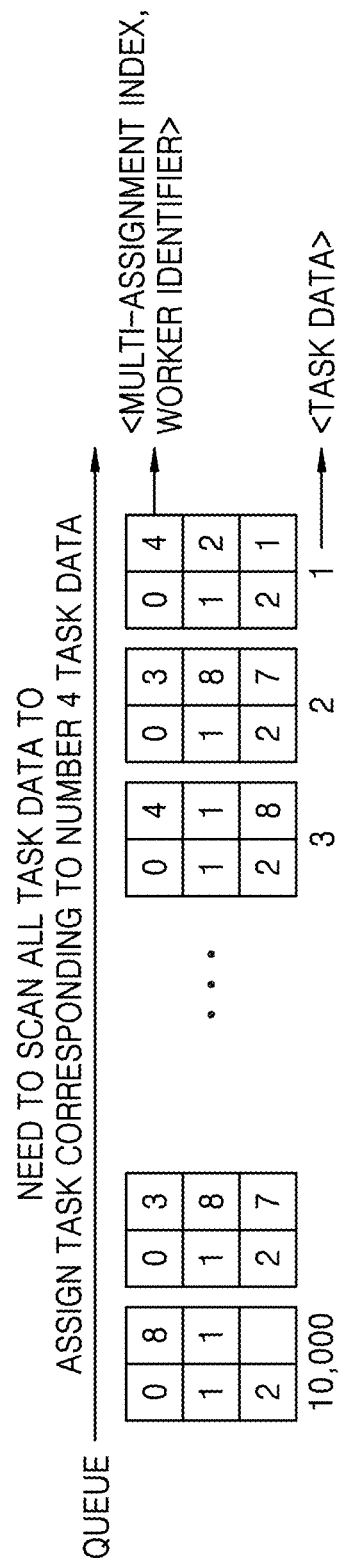
FIG. 3 is a view illustrating a data management method for existing task multi-assignment.

FIG. 3 is a view illustrating a data management method for existing task multi-assignment.

In the existing task multi-assignment method, only 10,000 pieces of data may be controlled at a time, and data may be loaded into a queue area as many as the number of pieces of actually assignable data. In other words, the number of pieces of data loaded into one queue area may be defined via a multiplication operation of source data and a multi-assignment value.

Here, according to an existing technology, when the workload of workers approaches 10,000 work pieces that is the greatest storage unit, some work waits occur until tasks for task items loaded in a current queue are all multi-assigned to the other workers. Also, when the multi-assignment for the current queue is completed, a queue into which 10,000 task items may be additionally loaded is additionally generated. The occurrence of such work waits may ultimately lead to a waste of resources and delays in schedules of projects.

Also, a process of scanning the entire queue area is needed to multi-assign tasks to any worker. In other words, as shown in FIG. 3, 10,000 pieces of task data loaded into the entire queue need to be all scanned to assign a particular worker a task corresponding to task data (e.g., task data 4) loaded into an intermediate portion of the queue area, thereby leading to a slowdown for other workers.

In addition, according to the existing technology, due to the limitations of a Java list data structure, as a difference in workload between workers is great, the scan performance decreases. In other words, a scanning process is needed to ensure that the same task as a task that is already completed is not assigned to a worker. Here, when any one worker performs a significant number of tasks alone, meaningless scans occur exponentially as many as the number of performed tasks when tasks are assigned to another worker.

In contrast, according to an embodiment, a queue area and a stack area in a task assignment tier, a task reassignment tier, and a rejection task tier may be defined, and a key-value of each item in the queue area and the stack area may be inquired and managed. Therefore, a task may be assigned to a worker by quickly scanning an assignable task via a single scan without a load in a scanning process for task multi-assignment.

Hereinafter, a task multi-assignment method using a tier data structure of a crowdsourcing-based project according to an embodiment will be described with reference to FIGS. 4 through 10B.

A task multi-assignment method using a tier data structure of a crowdsourcing-based project according to an embodiment applies a multi-assignment method of duplicately assigning each task to a plurality of n different workers 32 (wherein n is a natural number greater than 1). Here, the number of workers 32 who perform one task may be set to be the same for all tasks of a project. For example, when a particular task is duplicately assigned to three workers, another task may also be duplicately assigned to three workers.

In addition, according to an embodiment, a task may be multi-assigned to a plurality of workers 32 by using a tier data structure.

In one embodiment, a tier data structure includes an assignment tier storage for assigning a new task to the worker 32, a reassignment tier storage for reassigning the assigned task, and a rejection tier storage for managing a work result that is submitted for the assigned task and then rejected.

Each tier storage as described above may include a queue or a stack. According to the disclosure, through events for pushing and popping of data in a queue or a stack of each tier storage, a plurality of tasks that need to be multi-assigned may be more quickly managed via a single scan of a tier data structure.

Hereinafter, a series of processes that are performed in an assignment tier storage, a rejection tier storage, and a reassignment tier storage will be each described, and then a process that is performed according to the priority of each tier storage will be described.

Figure 4:
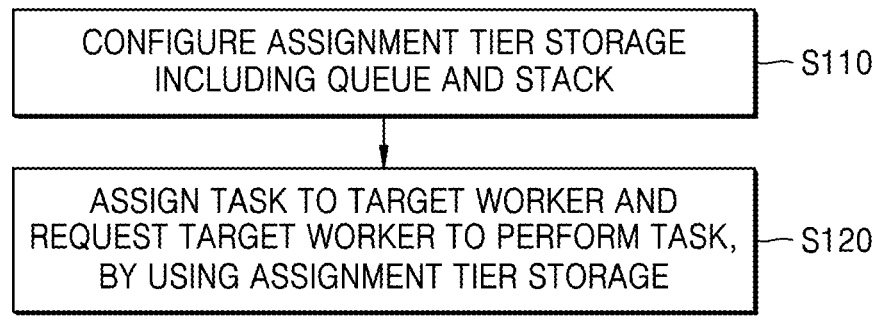
FIG. 4 is a flowchart illustrating a process of assigning a task by using an assignment tier storage.

FIG. 4 is a flowchart illustrating a process of assigning a task by using an assignment tier storage. FIGS. 5A through 5G are views illustrating an example of assigning a task by using an assignment tier storage.

It may be understood that operations illustrated in FIG. 4 are performed by a platform server (hereinafter, referred to as a server) operated by the service provider company 20, but the operations are not limited thereto.

In operation S110, the server configures an assignment tier storage for assigning a new task to the worker 32. In operation S120, the server assigns a task of a project to a worker (hereinafter, referred to as a target worker) who requests task assignment by using the assignment tier storage and requests the worker to perform the task.

In one embodiment, an assignment tier storage includes a queue and a stack.

In detail, the queue is configured so that task data corresponding to a task that is not assigned to the worker 32 is pushed thereinto. Also, the stack is configured so that task data corresponding to tasks that are each assigned j times is pushed thereinto, and includes one or more $j^{th}$ stacks. For example, when each task needs to be assigned to three different workers, an assignment tier storage includes one queue, a first stack, and a second stack. Hereinafter, the number of multi-assigned workers will be described as three.

Task data that is pushed into a queue or a stack of an assignment tier storage and managed includes a key-value pair including an identifier of a task and n pieces of multi-assignment data. Also, the multi-assignment data includes a key-value pair including a multi-assignment index and an identifier of the worker 32 who is assigned a task.

Figure 5A:
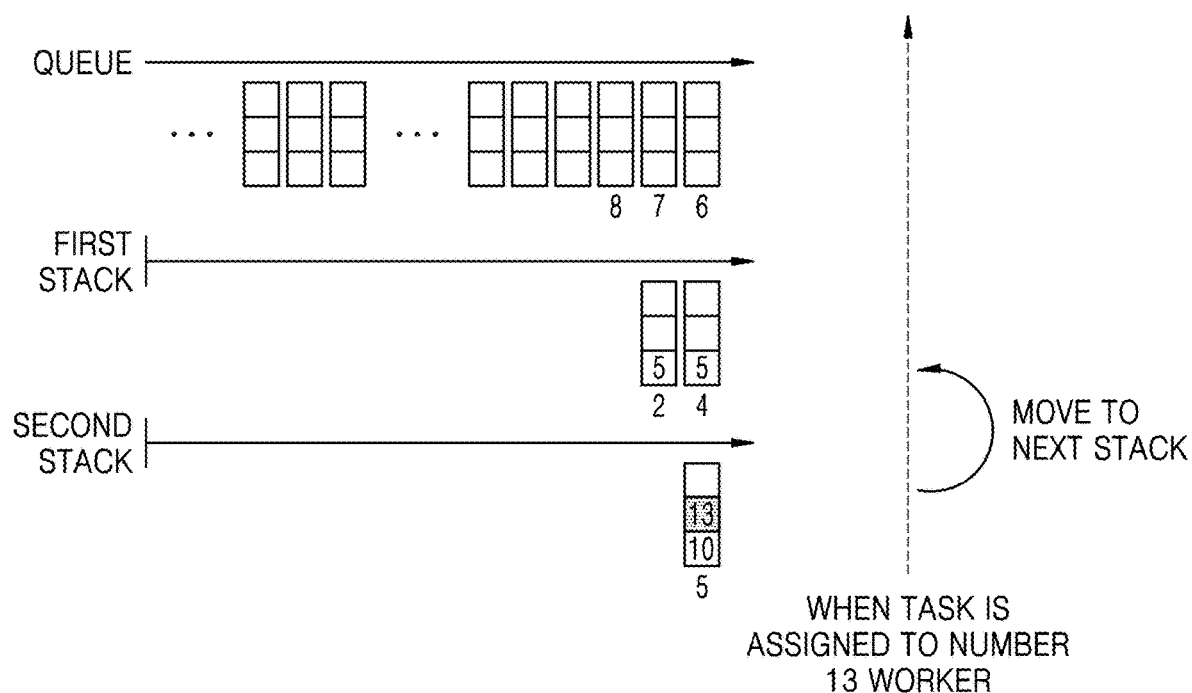
FIGS. 5A through 5G are views illustrating an example of assigning a task by using an assignment tier storage.

For example, task data at the top of a first stack shown in FIG. 5A has, as a key-value, an identifier of a number 4 task and three pieces of multi-assignment data. From among three pieces of multi-assignment data, the multi-assignment data that is assigned to a number 5 worker is configured to have, as a key-value, an identifier of the number 5 worker and a multi-assignment index 1.

The server extracts task data at the top of a current stack in a descending order with respect to one or more $j^{th}$ stacks to assign a task of a project to the worker 32 and request the worker 32 to perform the task. Also, the server identifies whether or not the task data at the top of the current stack includes an identifier of the target worker 32.

When identifying that the task data at the top of the current stack includes the identifier of the target worker 32, the server moves to a next stack. Here, even when the current stack is empty due to the movement of all of task data of the current stack, or even when the current stack is deleted, the server moves to a next stack.

Referring to FIG. 5A, when the server assigns a task to a number 13 worker and requests the number 13 worker to perform the task, the server extracts task data at the top of a second stack in a descending order. Also, the server identifies whether or not the task data at the top of the second stack includes an identifier of the number 13 worker. Here, the second stack is a stack into which task data corresponding to a task assigned to two workers is pushed from among tasks to be each multi-assigned to a total of three workers and corresponds to the top $(n-1^{th})$ stack.

Here, as the result of identifying the top task data of the second stack, a number 10 worker and a multi-assignment index 1, and the number 13 worker and a multi-assignment index 2 are recorded as key-values in number 5 task data that is the top task data. This state indicates that a task corresponding to the number 5 task data is first assigned to the number 10 worker, and then assigned to the number 13 worker, and is performed.

As described above, the number 5 task data of the second stack includes an identifier of the number 13 worker in advance. In this case, the server moves to a first stack that is a next stack without assigning the task corresponding to the number 5 task data to the number 13 worker.

When the top task data of a current stack does not include an identifier of the target worker 32, the server pops task data from the current stack, assigns a task corresponding to the task data popped from the current stack to the target worker 32, and requests the target worker 32 to perform the task. Also, the identifier of the target worker 32 is input into multi-assignment data of the task data popped from the current stack, and the task data popped from the current stack is pushed into a previous stack.

Figure 5B:
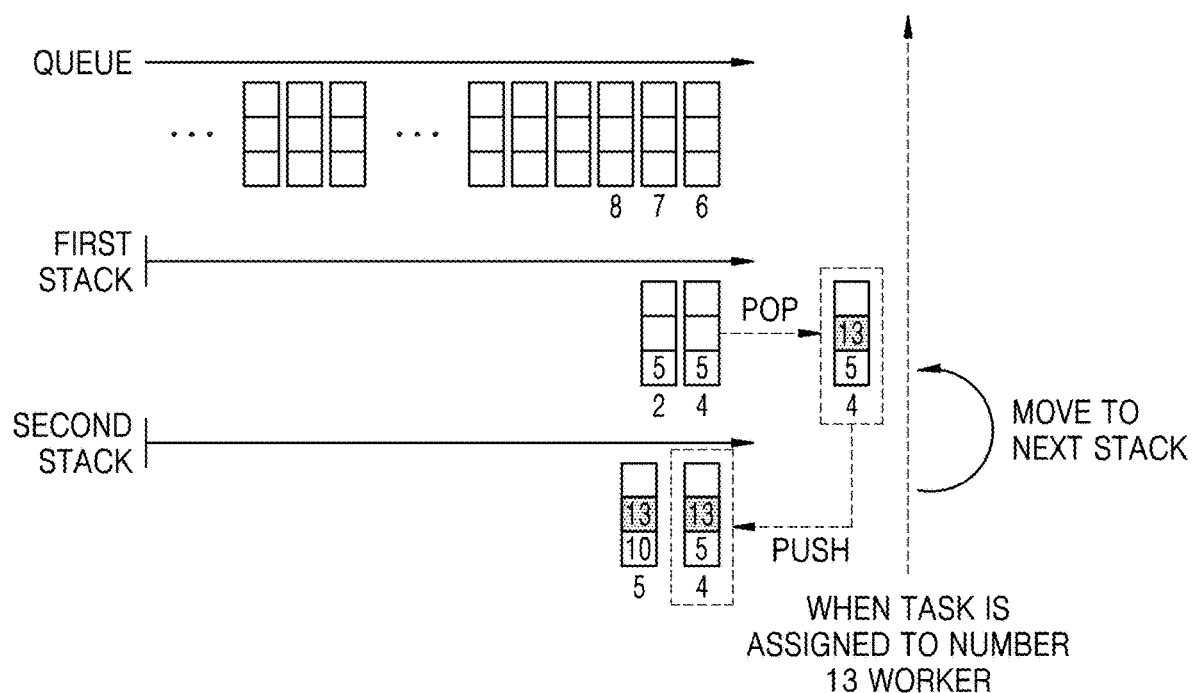

Referring to FIG. 5B, as the result of identifying the top task data of a first stack after moving from a second stack to the first stack, number 4 task data that is the top task data of the first stack that is a current stack does not include an identifier of a number 13 worker. Therefore, the server pops the number 4 task data of the first stack, assigns a task corresponding to the number 4 task data to the number 13 worker, and requests the number 13 worker to perform the task.

Also, the server inputs the identifier of the number 13 worker into multi-assignment data of the number 4 task data popped from the first stack, and pushes the number 4 task data into the second stack that is a previous stack.

When the first stack is empty, the first stack is deleted, or the top task data of the first stack includes the identifier of the target worker 32, the server moves to a queue. In other words, the server identifies the top task data of j stacks in a descending order. When a task is not assignable to the target worker 32 as the result of identifying the first stack that is the last stack, the server moves to the queue that is a next turn.

The server dequeues task data from the queue, assigns a task corresponding to the task data dequeued from the queue to the target worker 32, and requests the target worker 32 to perform the task. Also, the server inputs the identifier of the target worker 32 into multi-assignment data of the task data dequeued from the queue, and pushes the task data dequeued from the queue into the first stack.

Figure 5C:
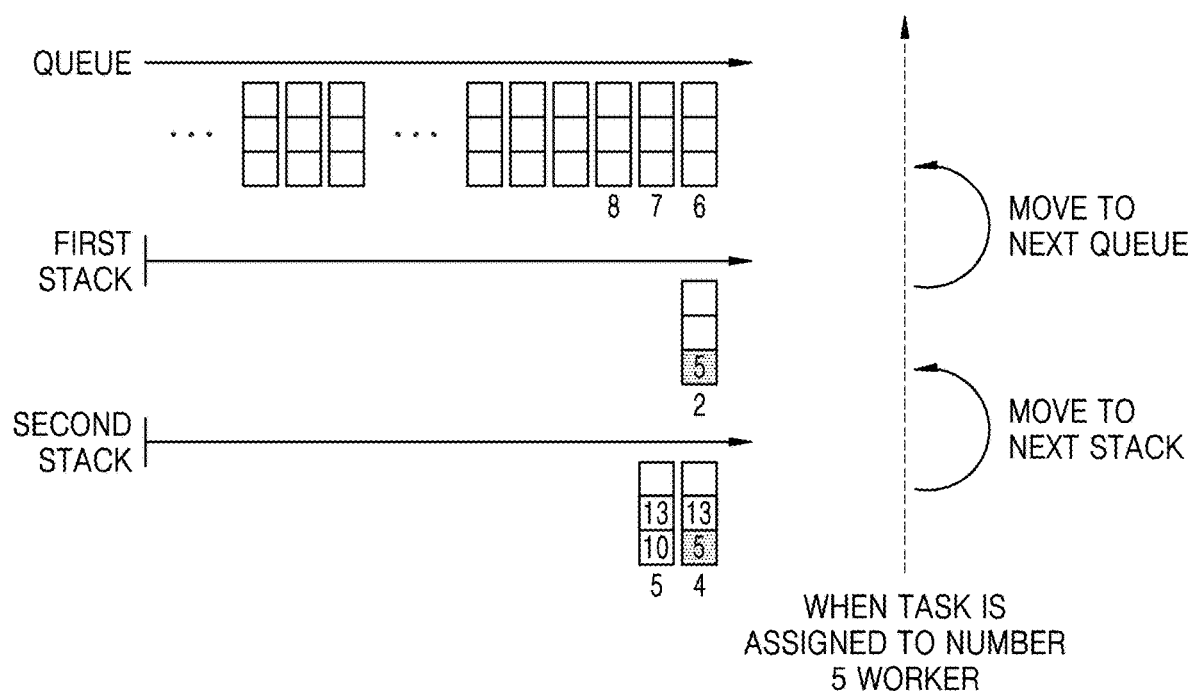

Referring to FIG. 5C, when assigning a task to a number 5 worker and requesting the number 5 worker to perform the task, the server extracts the top task data from a second stack in a descending order and identifies that number 4 task data that is the top task data of the second stack includes an identifier of the number 5 worker. Therefore, the server moves to a first stack that is a next stack without assigning a task corresponding to the number 4 task data to the number 5 worker.

The server identifies the top task data of the first stack after moving from the second stack to the first stack. When number 2 task data that is the top task data of the first stack also includes the identifier of the number 5 worker as the result of the identification, the server moves a next queue without assigning a task corresponding to the number 2 task data to the number 5 worker.

Figure 5D:
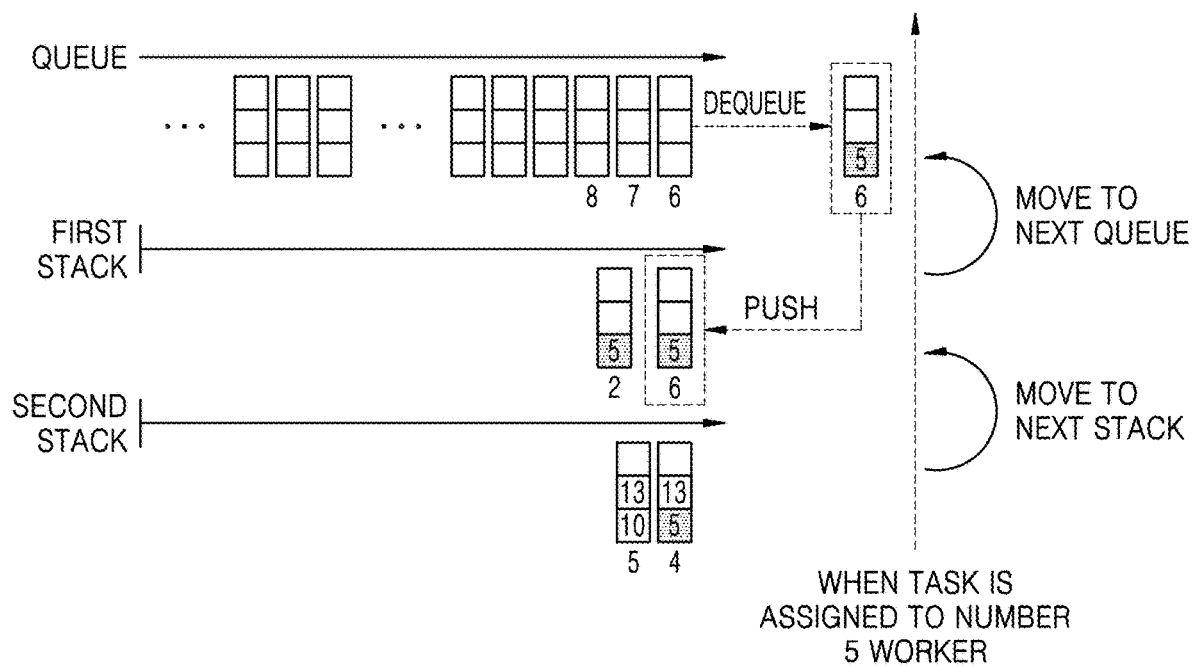

Referring to FIG. 5D, task data corresponding to a task that is not assigned to the worker 32 is pushed into a queue. The server dequeues number 6 task data at the top of a queue without an identification process as in a stack, assigns a task corresponding thereto to the number 5 worker, and requests the number 5 worker to perform the task. Also, the server inputs an identifier of the number 5 worker into multi-assignment data of the number 6 task data dequeued from the queue, and pushes the number 6 task data into the first stack.

According to the method as described above, unlike an existing method in which all pieces of task data pushed into a queue need to be dequeued and identified, in one embodiment, a task may be multi-assigned more quickly via a single scan of the top task data pushed into a stack or a queue.

The server pops task data from a current stack, and, when the current stack no longer includes task data, deletes the current stack.

Also, when a previous stack is deleted before the task data popped from the current stack is pushed into the previous stack, the server re-generates the previous stack. Similarly, when a first stack is deleted before task data dequeued from a queue is pushed into the first stack, the server re-generates the first stack.

Figure 5E:
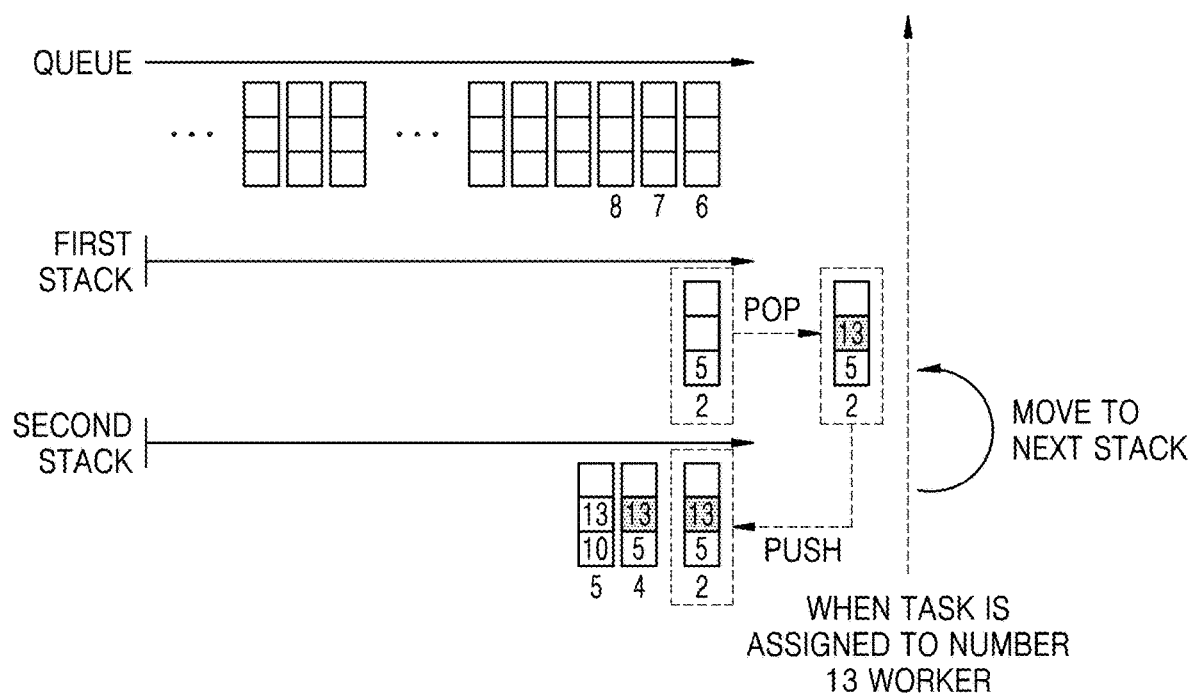

For example, referring to FIG. 5E illustrating states of a current stack and a queue, when the server assigns a task to a number 13 worker and requests the number 13 worker to perform the task, number 4 task data at the top of a second stack includes an identifier of a number 13 worker. Therefore, the server moves from the second stack to a first stack to identify the top task data. As the result of the identification, number 2 task data of the first stack does not include the identifier of the number 13 worker. Therefore, the server assigns a task corresponding to the number 2 task data to the number 13 worker, and requests the number 13 worker to perform the task, inputs the identifier of the number 13 worker into the number 2 task data, and moves the number 2 task data to the second stack.

Figure 5F:
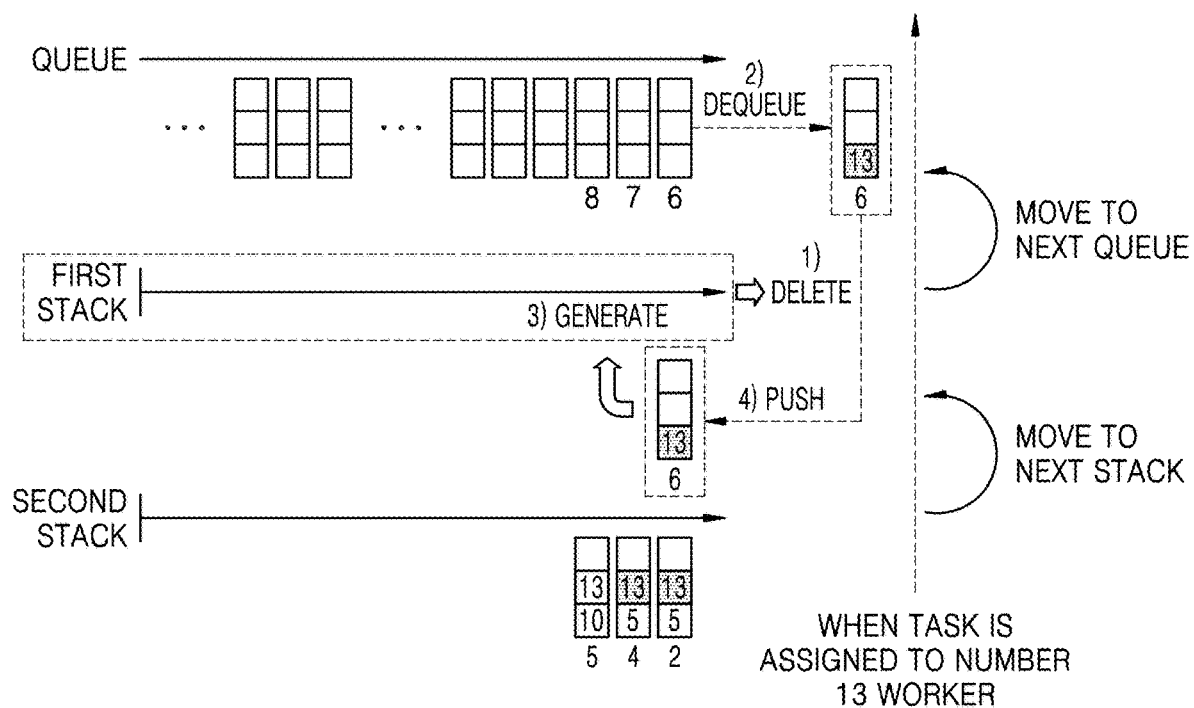

FIG. 5F illustrates a state after the number 2 task data is moved to the second stack as described with reference to FIG. 5E. As the number 2 task data is popped from the first stack that is a current stack, the first stack no longer includes task data. Therefore, the server deletes the first stack.

When the server assigns a task to a number 13 worker and requests the number 13 worker to perform the task, the top task data of the second stack includes the identifier of the number 13 worker, and thus, the server moves to the first stack. The first stack is deleted in a previous stage, and thus, the server moves to a next queue.

The server dequeues number 6 task data at the top of a queue without an identification process as in a stack, assigns a task corresponding thereto to the number 13 worker, and requests the number 13 worker to perform the task. Also, the server inputs an identifier of the number 13 worker into multi-assignment data of the number 6 task data dequeued from the queue, and pushes the number 6 task data into the first stack. Here, the first stack is deleted in the previous stage, and thus, the server re-generates the first stack to push the number 6 task data thereinto. This process may be equally applied to the relationship between a queue and a stack and the relationship between stacks.

In one embodiment, the server pops task data from an $n-1^{th}$ stack that is a current stack, i.e., an $n-1^{th}$ stack that is the top stack from among generated stacks, assigns a task corresponding to the task data popped from the $n-1^{th}$ stack to the target worker 32, and requests the target worker 32 to perform the task. Therefore, the server drops the task data popped from the $n-1^{th}$ stack.

Figure 5G:
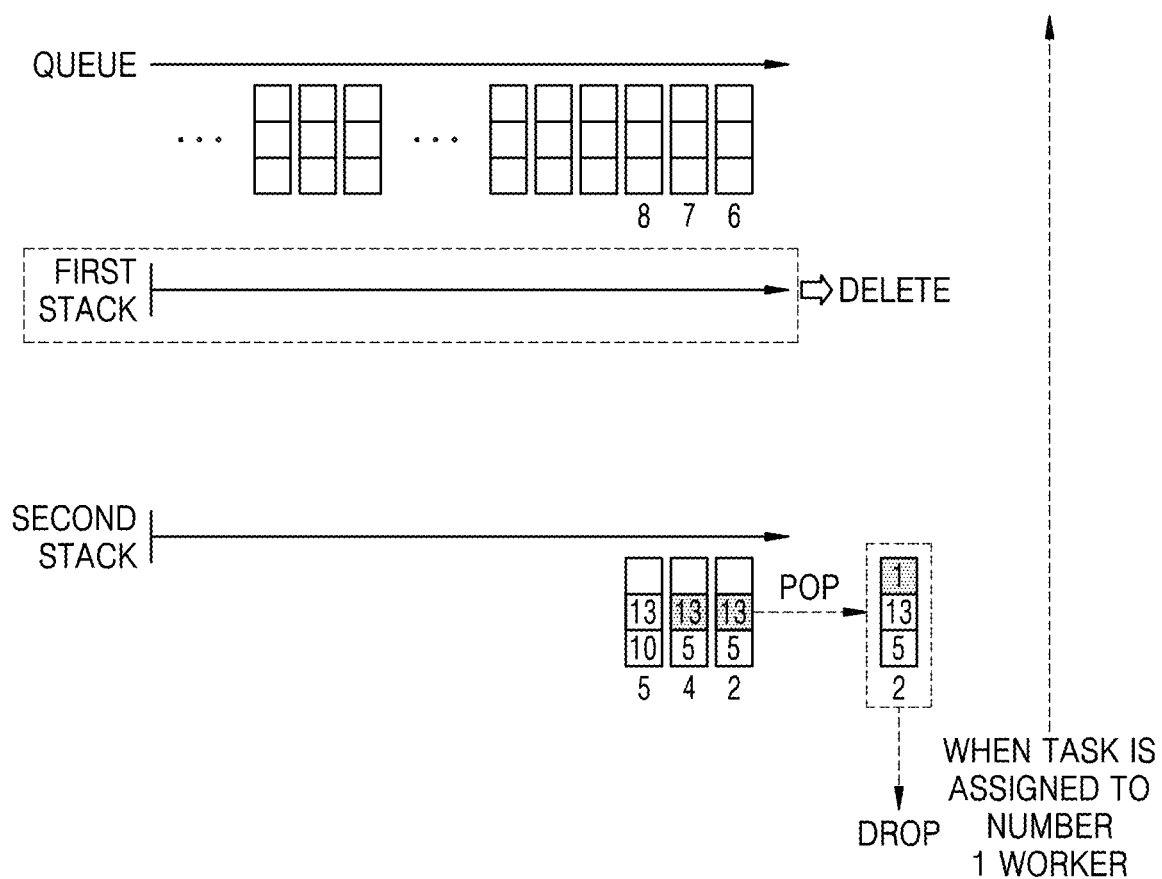

Referring to FIG. 5G, the server pops number 2 task data, assigns a corresponding task to a number 1 worker, and inputs an identifier of the number 1 worker into multi-assignment data of the number 2 task data to assign the number 1 worker a task corresponding to the number 2 task data that is pushed into a second stack that is an $n-1^{th}$ stack as a current stack.

Here, the second stack corresponds to the top stack. Therefore, in this case, the server does not generate an additional stack, and tasks of the number 2 task data are all multi-assigned to three workers. Accordingly, the server allows the number 2 task data to be dropped from an assignment tier storage.

According to one embodiment, through the process described above, as multi-assignment is completed, only task data remaining in a queue or a stack needs to be managed. Therefore, as a project progresses, scanning and multi-assignment may be performed faster.

Figure 6:
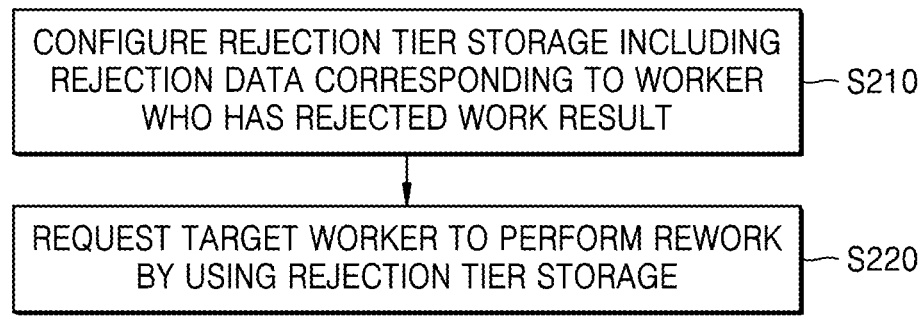
FIG. 6 is a flowchart illustrating a process of requesting the performance of rework by using a rejection tier storage.
Figure 7A:
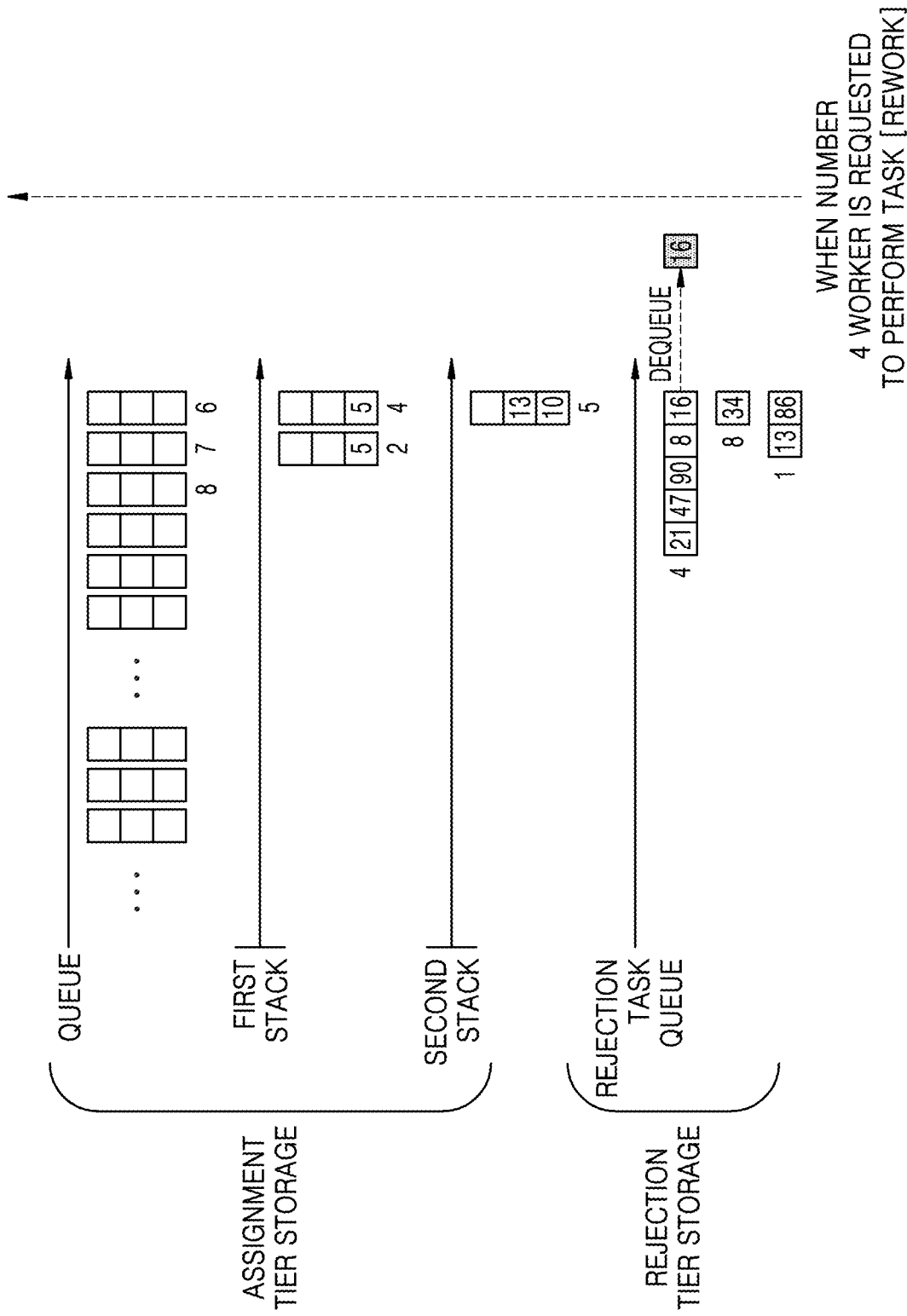
FIGS. 7A and 7B are views illustrating an example of requesting the performance of rework by using a rejection tier storage.
Figure 7B:
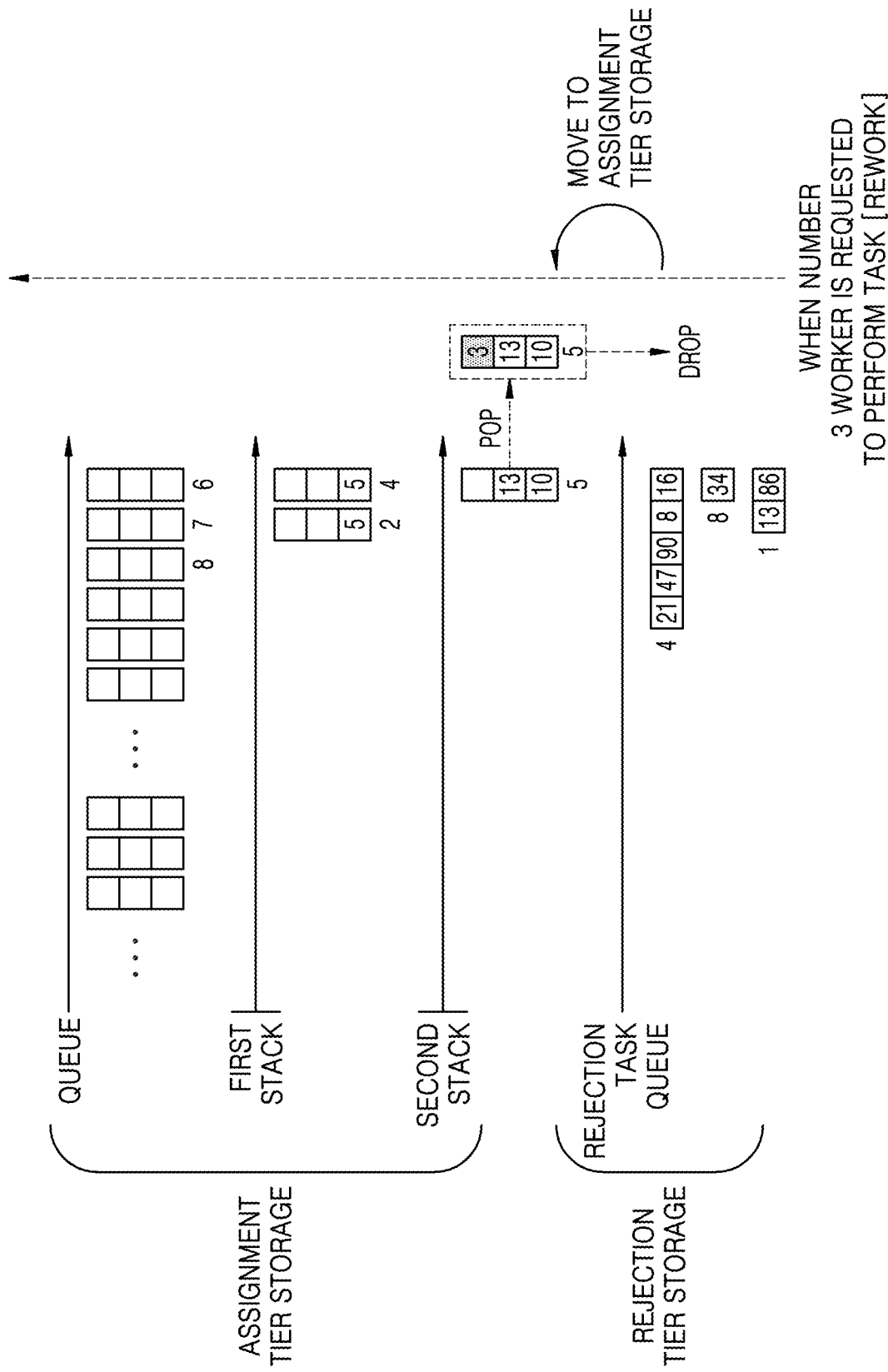

FIG. 6 is a flowchart illustrating a process of requesting the performance of rework by using a rejection tier storage. FIGS. 7A and 7B are views illustrating an example of requesting the performance of rework by using a rejection tier storage.

As described above with reference to FIG. 2, after the worker 32 is assigned a task and requested to perform the task, the worker 32 submits a work result, and the inspector 34 inputs an inspection pass or rejection as an inspection result for the work result.

Here, in operation S210, the server configures a rejection tier storage including one or more pieces of rejection data corresponding to the worker 32 who has a work result (hereinafter, referred to as a rejected work result) that is rejected according to an inspection result. When the target worker 32 has the rejected work result, in operation S220, the server requests the target worker 32 to perform rework by using a rejection tier storage.

Here, the rejection data includes a key-value pair including an identifier of the worker 32 who has the rejected work result and a rejection task queue, an identifier of a task corresponding to the rejected work result is enqueued into the rejection task queue.

For example, as shown in FIG. 7A, rejection data includes key-value pairs including a number 4 worker and a rejection task queue, a number 8 worker and a rejection task queue, and a number 1 worker and a rejection task queue. Also, 21, 47, 90, 8, and 16 are pushed as an identifier of a task corresponding to the rejected task result into the rejection task queue of the number 4 worker. Such rejection data is generated to correspond to the worker 32 whenever a rejected work result of the worker 32 is generated. Therefore, a rejection task queue is also generated to correspond to each worker 32 who has a rejected work result.

When a rejected work result occurs, the server enqueues an identifier of a task corresponding to the rejected work result into a rejection task queue corresponding to the worker 32 who inputs the rejected work result.

For example, in the case of the number 4 worker, when an identifier of 47, 90, 8, and 16 of a task corresponding to a rejected work result is enqueued into a rejection task queue, and a number 21 task is rejected, the server enqueues an identifier of the number 21 task into a location after number 47.

When the server requests the worker 32 to perform rework, the server identifies whether or not one or more pieces of rejection data of a rejection tier storage include the identifier of the target worker 32.

When the one or more pieces of rejection data of the rejection tier storage include the identifier of the target worker 32 as the result of the identification, the server dequeues an identifier of a task corresponding to a rejected work result from a rejection task queue corresponding to the target worker 32, and requests the target worker 32 to perform rework for a task corresponding to the dequeued identifier of the task.

As shown in FIG. 7A, when the server requests the number 4 worker to perform a task or rework, the server first identifies the rejection tier storage, when the number 4 worker has the identifier as the result of the identification, enqueues an identifier of a number 16 task corresponding to a rejected work result from a rejection task queue, and requests the number 4 worker to perform rework for a task corresponding to the enqueued identifier of the number 16 task.

When the rework for the task corresponding to the identifier of the number 16 task is completed, the identifier of the number 16 task is dropped. When the task is re-rejected and needs rework, the task is re-enqueued into the rejection task queue corresponding to the number 4 worker.

In contrast, when the one or more pieces of rejection data of the rejection tier storage do not include the identifier of the target worker 32 as the result of the identification, the server assigns a task of a project to the target worker 32 and requests the target worker 32 to perform the task by using an assignment tier storage.

In other words, according to one embodiment, when the server requests the worker 32 to perform a task, the server identifies, via a scan of a rejection tier storage, whether or not a rejected work result is included. When the rejected work result is not included, the server assigns a task to the target worker 32 and requests the target worker 32 to perform the task by using an assignment tier storage.

For example, as shown in FIG. 7B, when a number 3 worker is requested to perform a task, the number 3 worker does not currently have a rejected work result. Therefore, a rejection tier storage does not include an identifier of the number 3 worker. In this case, the server moves from the rejection tier storage to an assignment tier storage, and then, as described above with reference to FIGS. 4 through 5G, sequentially scans from the top stack to determine whether or not to assign a task.

Figure 8:
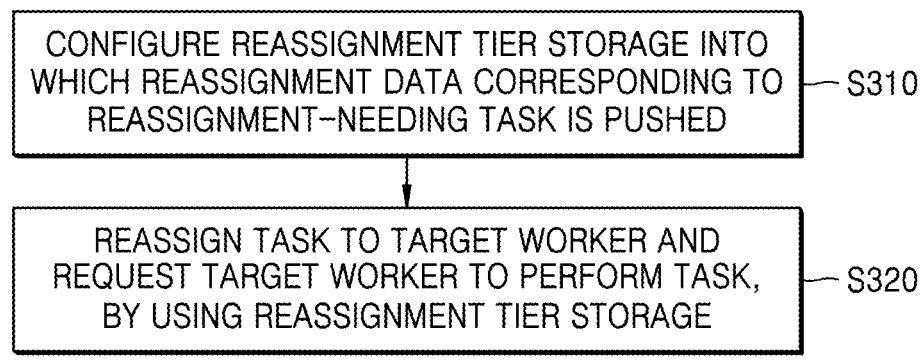
FIG. 8 is a flowchart illustrating a process of requesting the performance of a task by using a reassignment tier storage.
Figure 9B:
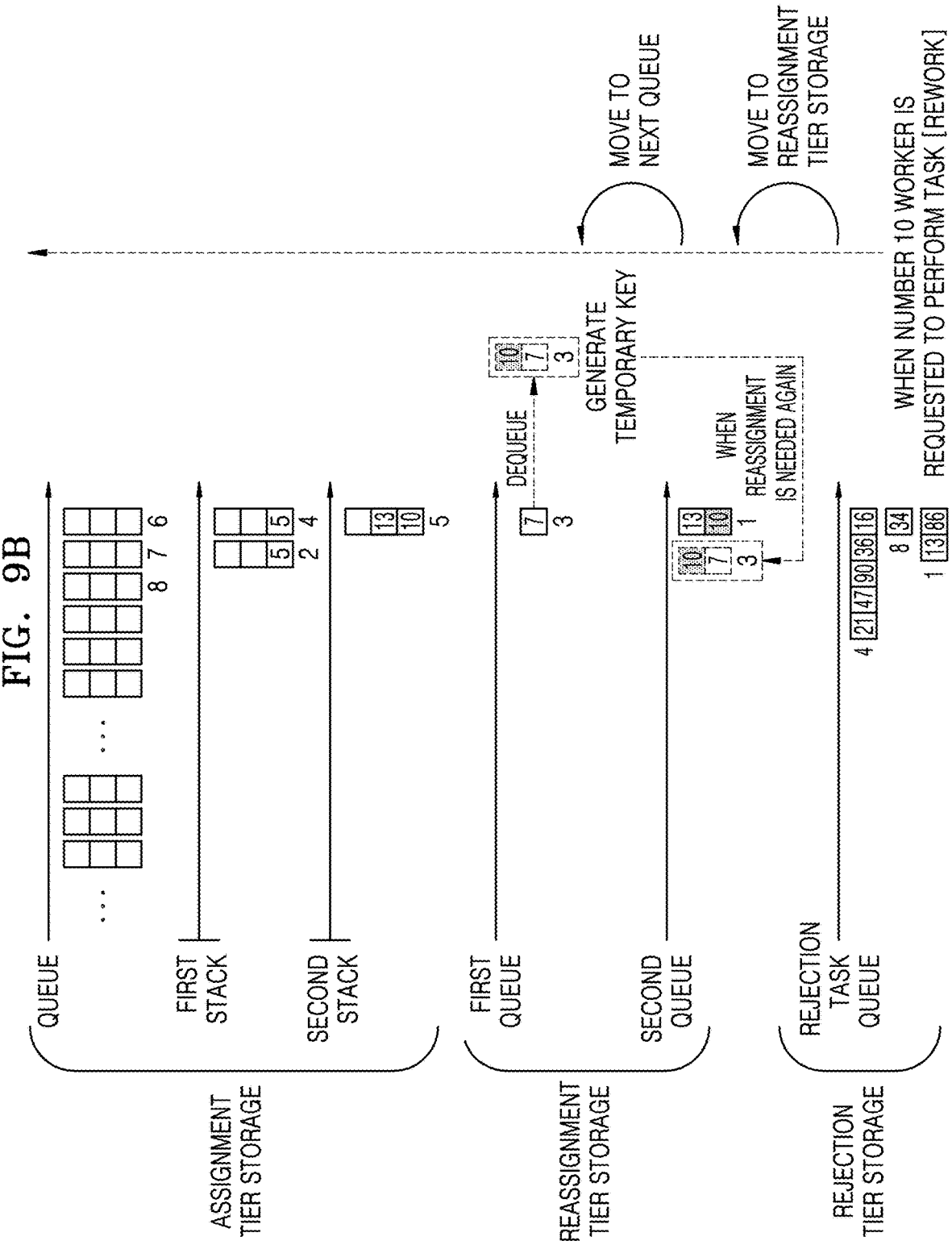

FIG. 8 is a flowchart illustrating a process of requesting the performance of a task by using a reassignment tier storage. FIGS. 9A through 9C are views illustrating an example of requesting the performance of a task by using a reassignment tier storage.

In operation S310, the server configures a reassignment tier storage into which reassignment data corresponding to a task (hereinafter, referred to as a reassignment-needing task) to be reassigned to a new worker 32 is enqueued. In operation S320, the server reassigns a task of a project to the target worker 32 and requests the target worker 32 to perform the task by using the reassignment tier storage.

In one embodiment, the reassignment tier storage is configured to include one or more $k^{th}$ queues into which reassignment data is enqueued on the basis of a $k^{th}$ number of reassignments (wherein k is a natural number). For example, when a task that is assigned to the worker 32 needs to be first reassigned to a new worker 32 due to the release of the assignment of the task, the abandonment of the task, or the like, reassignment data corresponding to the reassignment-needing task is enqueued into a first queue.

Also, with respect to the reassignment data enqueued into the first queue, a task is reassigned to a new worker once but is not performed. Therefore, when the task needs to be reassigned a second time, the corresponding reassignment data is enqueued into a second queue.

In other words, according to one embodiment, the number of queues in a reassignment tier storage is configured as many as the number corresponding to the number of reassignments.

Reassignment data that is enqueued into a queue in the reassignment tier storage and managed includes a key-value pair including a set of an identifier of a reassignment-needing task and one or more identifiers of a previous worker to which the reassignment-needing task is assigned.

For example, as shown in FIG. 9A, reassignment data enqueued into a first queue in a reassignment tier storage includes a key-value pair including an identifier of a number 3 reassignment-needing task and an identifier of a number 7 worker who has history of being assigned a task corresponding to a number 3 task.

Also, reassignment data enqueued into a second queue includes a key-value pair including a set of an identifier of a number 1 reassignment-needing task and identifiers of a number 10 worker and a number 13 worker who have history of being assigned or reassigned a number 1 task.

When a reassignment-needing task occurs, the server enqueues reassignment data corresponding to the reassignment-needing task into a $k^{th}$ queue corresponding to a number of reassignments of the reassignment-needing task. In other words, as shown in FIG. 9A, when a number 7 worker gives up a task corresponding to number 3 task data, reassignment is needed once. Therefore, the server enqueues number 3 reassignment data corresponding to the reassignment-needing task into a first queue.

The server dequeues reassignment data from a current queue in a descending order with respect to one or more $k^{th}$ queues and identifies whether or not the reassignment data dequeued from the current queue includes an identifier of the target worker 32 to request the performance of reassignment of a task corresponding to the reassignment data enqueued into the reassignment tier storage.

When the reassignment data dequeued from the current queue does not include the identifier of the target worker 32 as the result of the identification, the server reassigns the target worker 32 a task corresponding to the reassignment data dequeued from the current queue and requests the target worker 32 to perform the task. Also, the server generates a temporary key including a set of an identifier of a reassignment-needing task of the reassignment data dequeued from the current queue and one or more identifiers of a previous worker 32 to which the identifier of the target worker 32 is added.

Referring to FIG. 9A, when the server dequeues number 1 reassignment data enqueued into a second queue and identifies that reassignment data corresponding to a number 1 task does not include an identifier of a number 5 worker, the server reassigns a task corresponding to the number reassignment data to the number 5 worker, and requests the number 5 worker to perform the task. Here, when the number 5 worker completes the reassigned task, the server drops the number 1 reassignment data. However, a reassignment issue occurs due to the abandonment of a reassigned task or the like, or the server includes an identifier of the number 5 worker in a set of identifiers of a previous worker and generates the included identifier as a temporary key, so that the same task is not assigned from an assignment tier storage.

In contrast, when reassignment data dequeued from a current queue includes an identifier of the target worker 32, the server moves to a next queue. Here, when the current queue is empty due to the movement of all task data of the current queue or even when the current queue is deleted, the server moves to a next queue.

Referring to FIG. 9B, when a rejection tier storage does not include rejection data corresponding to a number 10 worker upon request for the performance of a task from the number 10 worker, the server moves to a reassignment tier storage without requesting the performance of rework. Number 1 reassignment data enqueued into a second queue in the reassignment tier storage has history of assigning a task to the number 10 worker. Therefore, in this case, the server moves to a first queue that is a next queue. Number 3 reassignment data enqueued into a first queue does not include an identifier of the number 10 worker. Therefore, the server reassigns a task corresponding to the number 3 reassignment data to the number 10 worker, requests the number 10 worker to perform the task, and generates a temporary key related thereto.

The server dequeues reassignment data from a current queue, and then, when the current queue no longer includes reassignment data enqueued thereinto, deletes the current queue. Also, when a $k^{th}$ queue corresponding to a number of reassignments of the reassignment-needing task is deleted before enqueuing reassignment data corresponding to the reassignment-needing task into a next queue, the server re-generates the $k^{th}$ queue.

For example, as shown in FIG. 9B, as reassignment data is dequeued from a first queue in a reassignment tier storage, the first queue no longer includes the reassignment data enqueued thereinto. Therefore, the server deletes the first queue as shown in FIG. 9C.

When the first queue is deleted, a number 6 worker fails to perform a number 11 task. In this case, initial reassignment of the number 11 task is needed, and thus, the server re-generates the first queue corresponding to a number of reassignments of the reassignment-needing task, and then enqueues reassignment corresponding to the number 11 task into the first queue.

As shown in FIG. 9B, the reassignment-needing task that is reassigned to the target worker 32 may need to be re-assigned to a new worker (32). In this case, the server enqueues reassignment data corresponding to the reassignment-needing task that is reassigned to the target worker 32 into a $k^{th}$ queue corresponding to the number of reassignments of the reassignment-needing task that is reassigned to the target worker 32, by using a temporary key.

For example, the server reassigns a number 10 worker a task corresponding to number 3 reassignment data enqueued into a first queue, requests the number 10 worker to perform the task, and generates a temporary key related thereto. When the number 10 worker fails to perform the corresponding reassigned task, and reassignment is needed again, the server enqueues the number 3 reassignment data into a second queue corresponding to a number of reassignments by using a temporary key to which an identifier of the number 10 worker is added.

As described above, when a current queue is empty due to the movement of all task data of the current queue, or even when the current queue is deleted, the server moves to a next queue. In addition to such case, even when reassignment data dequeued from the current queue includes an identifier of the target worker 32, the server enqueues the reassignment data dequeued from the current queue into the current queue and moves to a next queue.

Referring to FIG. 9B, when the server dequeues number 1 reassignment data enqueued into the second queue in a reassignment tier storage and identifies that the number 1 reassignment data includes the identifier of the number 10 worker, the server re-enqueues the number 1 reassignment data into the bottom of the second queue that is a current queue, and then moves to the first queue that is a next queue to identify whether or not to perform reassignment.

Figure 10A:
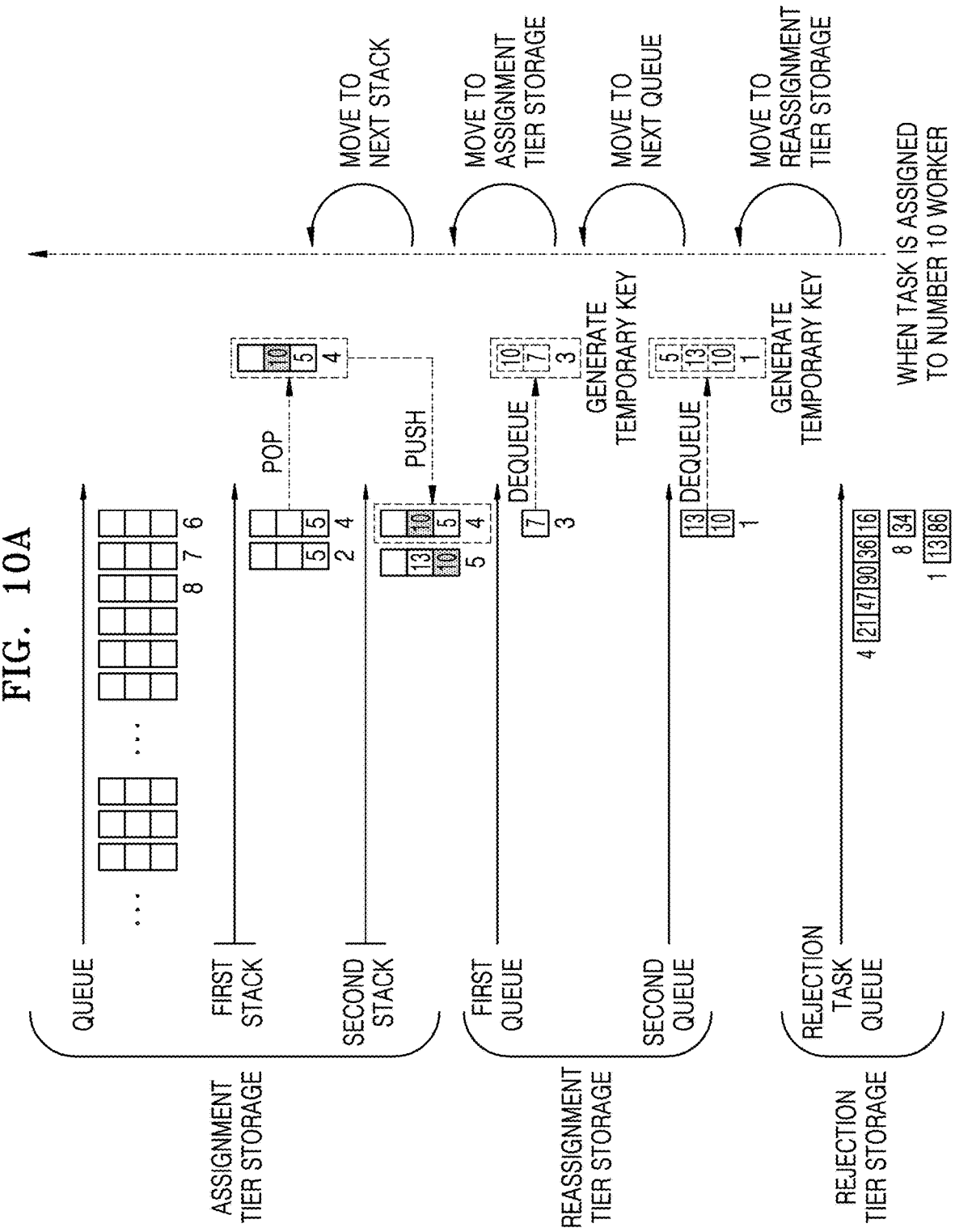

FIGS. 10A and 10B are views illustrating an example of requesting the performance of a task by using each tier storage.

In one embodiment, the server may prevent a task reassigned to a particular worker 32 from being assigned to the same worker 32, by using a temporary key.

In other words, when the server assigns a task of a project to a worker 32 and requests the worker 32 to perform the task, the server identifies an identifier of a task of the top task data of a current stack in an assignment tier storage, and identifies whether or not a temporary key including an identifier of the worker 32 for the top task data of the current stack includes an identifier of the target worker 32.

When the temporary key including the identifier of the task of the top task data of the current stack does not include the identifier of the target worker 32 as the result of the identification, the server allows the task corresponding to the top task data of the current stack to be assigned to the worker 32.

Referring to FIG. 10A, when the server identifies that a rejection tier storage does not include a rejected work result of a number 10 worker, and a reassignment tier storage does not include reassignment-needing data that may be assigned, the server needs to move to an assignment tier storage to assign a task to the number 10 worker.

Number 5 task data at the top of a second stack in the assignment tier storage includes the identifier of the number 10 worker. Therefore, the server moves to the first stack, number 4 task data at the top of the first stack does not include the identifier of the number 10 worker, and the temporary key does not include history of giving reassignment to the number 10 worker in relation to number 4 reassignment data. Accordingly, the server pops the number 4 task data of the first stack, assigns the number 10 worker a task corresponding to the number 4 task data popped from the first stack, and requests the number 10 worker to perform the task. Also, the server inputs an identifier of the number 10 worker into multi-assignment data of the number 4 task data popped from the first stack, and pushes the number 4 task data popped from the first stack into a second stack.

As shown in FIG. 10, when task data at the top of the first stack is number 3 task data, rather than number 4 task data, a temporary key includes an identifier of a number 10 worker for number 3 reassignment data. Therefore, in this case, the server moves to a next stack to prevent duplicate assignment of the number 3 task data to the number 10 worker, and, when the current stack is a first stack, moves to a queue.

As described above, in one embodiment, an assignment tier storage, a reassignment tier storage, and a rejection tier storage are used. Queues or stacks may be scanned in an order of the rejection tier storage, the reassignment tier storage, and the assignment tier storage to assign a task to a worker 32.

Referring to FIG. 10B, the server identifies one or more pieces of rejection data of a rejection tier storage, determines whether or not to request the target worker 32 to perform rework, and, when the one or more pieces of rejection data of the rejection tier storage do not include an identifier of the target worker 32, reassigns a task of a project to the target worker 32 and requests the target worker 32 to perform the task by using the reassignment tier storage.

When reassignment data dequeued from a current queue in the reassignment tier storage includes the identifier of the target worker 32, the reassignment tier storage no longer includes reassignment data, or a queue is deleted, the server assigns a task of a project to the target worker 32 and requests the target worker 32 to perform the task by using the assignment tier storage.

In the above description, according to an embodiment, operations S110 through S320 may be further divided into additional operations or may be combined into sub-operations. Also, some operations may be omitted when needed or the order between operations may also be changed. In addition, even though the following description of FIG. 11 is omitted, the description may also be applied to a multi-assignment method using a tier data structure of a crowdsourcing-based project described with reference to FIGS. 1 through 10B.

Hereinafter, a multi-assignment apparatus (400) (hereinafter, referred to as a task multi-assignment apparatus) using a tier data structure of a crowdsourcing-based project according to an embodiment will be described.

Figure 11:
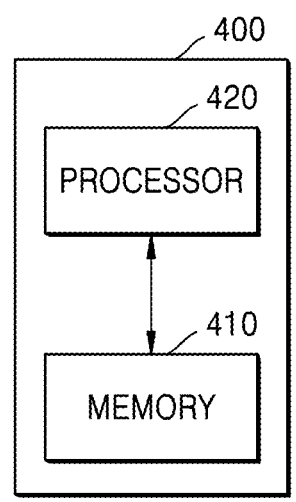
FIG. 11 is a block diagram illustrating a task multi-assignment apparatus, according to an embodiment.

FIG. 11 is a block diagram illustrating a task multi-assignment apparatus 400 according to an embodiment.

Referring to FIG. 11, the task multi-assignment apparatus 400 according to an embodiment includes a memory 410 and a processor 420.

The memory 410 stores a program for multi-assigning each task to a plurality of n different works (wherein n is a natural number greater than 1) by using a tier data structure.

The processor 420 executes the program stored in the memory 410. The processor 420 executes the program stored in the memory 410 to configure an assignment tier storage including a queue and one or more stacks, and assigns a task of a project to a target worker 32 and requests the target worker 32 to perform the task by using the assignment tier storage.

Here, the processor 420 extracts the top task data of a current stack, identifies whether or not the top task data includes an identifier of the target worker 32, and, when the top task data does not include the identifier of the target worker 32 as the result of the identification, pops the task data from the current stack, assigns a task corresponding thereto to the target worker 32, and requests the target worker 32 to perform the task. Also, the server inputs the identifier of the target worker 32 into multi-assignment data of the task data popped from the current stack, and pushes the task data popped from the current stack into a previous stack.

A task multi-assignment method using a tier data structure of a crowdsourcing-based project, according to an embodiment, as described above, may be implemented as a program (or an application) to be combined with a computer that is hardware and to be executed, and then may be stored in a medium.

In order for the computer to read the program and execute the methods implemented as the program, the above-described program may include a code written in a computer language such as C, C++, JAVA, Ruby, and machine language that may be read by a processor (CPU) of the computer via a device interface of the computer. Such code may include functional code related to a function that defines functions needed for executing the above methods and the like, and may include execution procedure-related control code needed for the processor of the computer to execute the functions according to a preset procedure. Also, such code may further include memory reference-related code indicating a location (address) in an internal or external memory of the computer at which additional information or media needed for the processor of the computer to execute the functions may be referred to. Also, when the processor of the computer needs to communicate with any other computer or server at a remote location to execute the functions, the code may further include communication-related code indicating a method of communicating with any other computer or server at a remote location by using a communication module of the computer, and information or media that is transmitted and/or received during communication and the like.

The storage medium refers to a medium that stores data semi-permanently and may be read by a device, rather than a medium that stores data for a short moment, such as a register, a cache, or a memory. In detail, examples of the storage medium include ROM, RAM, CD-ROMs, magnetic tape, floppy disks, optical data storage devices, and the like but are not limited thereto. In other words, the program may be stored in various types of recording media on various servers that may be accessed by the computer or in various types of recording media on the computer of a user. Also, the media may be distributed over network-coupled computer systems so that computer-readable code is stored in a distributed fashion.

The foregoing description of the disclosure is for purposes of illustration, and those of ordinary skill in the art to which the disclosure pertains may understand that it may be easily modified into other specific forms without changing the technical spirit or essential features of the disclosure. Therefore, it may be understood that the embodiments described above are illustrative in all respects and not restrictive. For example, each element described as a single type may be implemented in a distributed manner, and likewise, elements described as being distributed may also be implemented in a combined form.

The scope of the disclosure is defined by the following claims, rather than by the above description, and all changes or modifications derived from the concept and scope of the claims and equivalents thereof may be construed as being included in the scope of the disclosure.

What is claimed is:

1. A task multi-assignment method using a tier data structure of a crowdsourcing-based project, the method being performed by a computer, being a task assignment method using a tier data structure of a crowdsourcing-based project (hereinafter, a project) of a multi-assignment method of duplicately assigning each task to a plurality of n different workers (wherein n is a natural number greater than 1), and comprising:

configuring an assignment tier storage including a queue into which task data corresponding to a task that is not assigned to the worker is enqueued, and one or more $j^{th}$ stacks into which task data corresponding to tasks that are each assigned j times (wherein j is a natural number less than n) is pushed; and assigning a task of the project to a worker (hereinafter, a target worker) who requests task assignment and requesting the target worker to perform the task, by using the assignment tier storage;

configuring a rejection tier storage including one or more pieces of rejection data corresponding to a worker who has a work result (hereinafter, a rejected work result) that is rejected according to an inspection result; and, when the target worker has the rejected work result, requesting the target worker to perform rework by using the rejection tier storage, wherein the task data includes a key-value pair including an identifier of the task and n pieces of multi-assignment data, the multi-assignment data includes a key-value pair including an identifier of a worker to which the task is assigned, and a multi-assignment index, the assigning the task of the project and requesting to perform the task includes extracting task data at the top of a current stack in a descending order with respect to the one or more $j^{th}$ stacks, identifying whether or not the task data at the top of the current stack includes an identifier of the target worker, when the task data at the top of the current stack does not include the identifier of the target worker, popping the task data from the current stack, assigning a task corresponding to the task data popped from the current stack to the target worker, requesting the target worker to perform the task, inputting the identifier of the target worker into the multi-assignment data of the task data popped from the current stack, and pushing the task data popped from the current stack into a previous stack, the rejection data includes a key-value pair including an identifier of a worker who has the rejected work result, and a rejection task queue, an identifier of a task corresponding to the rejected work result is enqueued into the rejection task queue, the requesting to perform the rework includes, when a rejected work result occurs, enqueuing an identifier of a task corresponding to the rejected work result into a rejection task queue corresponding to a worker who inputs the rejected work result, identifying whether or not the one or more pieces of rejection data of the rejection tier storage include the identifier of the target worker, and when the one or more pieces of rejection data of the rejection tier storage include the identifier of the target worker, dequeuing an identifier of a task corresponding to the rejected work result from a rejection task queue corresponding to the target worker, and requesting the target worker to perform rework for a task corresponding to the dequeued identifier of the task.

2. The task multi-assignment method of claim 1, wherein the assigning the task of the project and requesting to perform the task includes, when the current stack is empty, the current stack is deleted, or the task data at the top of the current stack includes the identifier of the target worker, moving to a next stack.

3. The task multi-assignment method of claim 2, wherein the assigning the task of the project and requesting to perform the task includes, when a first stack is empty, the first stack is deleted, or the task data at the top of the first stack includes the identifier of the target worker, moving to the queue, dequeuing the task data from the queue, assigning a task corresponding to the task data dequeued from the queue to the target worker, requesting the target worker to perform the task, inputting the identifier of the target worker into the multi-assignment data of the task data dequeued from the queue, and pushing the task data dequeued from the queue into the first stack.

4. The task multi-assignment method of claim 3, wherein the assigning the task of the project and requesting to perform the task includes, when the current stack is empty after the task data is popped from the current stack, deleting the current stack, when the previous stack is deleted before the task data popped from the current stack is pushed into the previous stack, re-generating the previous stack, and, when the first stack is deleted before the task data dequeued from the queue is pushed into the first stack, re-generating the first stack.

5. The task multi-assignment method of claim 1, wherein the assigning the task of the project and requesting to perform the task includes, when the current stack is an $n-1^{th}$ stack, popping the task data from the $n-1^{th}$ stack, assigning a task corresponding to the task data popped from the $n-1^{th}$ stack to the target worker, requesting the target worker to perform the task, and dropping the task data popped from the $n-1^{th}$ stack.

6. The task multi-assignment method of claim 1, wherein the assigning the task of the project and requesting to perform the task includes, when the one or more pieces of rejection data of the rejection tier storage do not include the identifier of the target worker, assigning a task of the project to the target worker and requesting the target worker to perform the task, by using the assignment tier storage.

7. The task multi-assignment method of claim 1, further comprising:

configuring a reassignment tier storage including one or more $k^{th}$ queues enqueued on the basis of a $k^{th}$ number of reassignments (wherein k is a natural number) of reassignment data corresponding to each task (hereinafter, a reassignment-needing task) to be reassigned to a new worker; and reassigning a task of the project to the target worker and requesting the target worker to perform the task, by using the reassignment tier storage, wherein the reassignment data includes a key-value pair including a set of an identifier of the reassignment-needing task and one or more identifiers of a previous worker to which the reassignment-needing task is assigned, and the reassigning the task of the project and requesting to perform the task includes, when a reassignment-needing task occurs, enqueuing reassignment data corresponding to the reassignment-needing task into the $k^{th}$ queue corresponding to a number of reassignments of the reassignment-needing task, dequeuing reassignment data from a current queue in a descending order with respect to the one or more $k^{th}$ queues, identifying whether or not the reassignment data dequeued from the current queue includes the identifier of the target worker, when the reassignment data dequeued from the current queue does not include the identifier of the target worker, reassigning a task corresponding to the reassignment data dequeued from the current queue to the target worker, requesting the target worker to perform the task, and generating a temporary key including a set of the identifier of the reassignment-needing task of the reassignment data dequeued from the current queue and the one or more identifiers of the previous worker to which the identifier of the target worker is added.

8. The task multi-assignment method of claim 7, wherein the reassigning the task of the project and requesting to perform the task includes, when the current queue is empty, the current queue is deleted, or the reassignment data dequeued from the current queue includes the identifier of the target worker, moving to a next queue.

9. The task multi-assignment method of claim 7, wherein the reassigning the task of the project and requesting to perform the task includes, when the current queue is empty after the reassignment data is dequeued from the current queue, deleting the current queue, and, when the $k^{th}$ queue corresponding to a number of reassignments of the reassignment-needing task is deleted before the reassignment data corresponding to the reassignment-needing task is enqueued, re-generating the $k^{th}$ queue.

10. The task multi-assignment method of claim 7, wherein the reassigning the task of the project and requesting to perform the task includes, when the reassignment-needing task that is reassigned to the target worker needs to be reassigned to a new worker again, enqueuing reassignment data corresponding to a reassignment-needing task that is reassigned to the target worker into the $k^{th}$ queue corresponding to a number of reassignments of the reassignment-needing task that is reassigned to the target worker, by using the temporary key.

11. The task multi-assignment method of claim 7, wherein the reassigning the task of the project and requesting to perform the task includes, when the current queue is empty or the current queue is deleted, moving to a next queue, and, when reassignment data dequeued from the current queue includes the identifier of the target worker, re-enqueuing the reassignment data dequeued from the current queue into the current queue and moving to the next queue.

12. The task multi-assignment method of claim 7, wherein the assigning the task of the project and requesting to perform the task includes identifying an identifier of the task of the task data at the top of the current stack, identifying whether or not the temporary key including the identifier of the task of the task data at the top of the current stack includes the identifier of the target worker, when the temporary key including the identifier of the task of the task data at the top of the current stack does not include the identifier of the target worker and the task data at the top of the current stack does not include the identifier of the target worker, popping the task data from the current stack, assigning a task corresponding to the task data popped from the current stack to the target worker, requesting the target worker to perform the task, inputting the identifier of the target worker into the multi-assignment data of the task data popped from the current stack, and pushing the task data popped from the current stack into a previous stack.

13. The task multi-assignment method of claim 12, wherein the assigning the task of the project and requesting to perform the task includes, when the temporary key including the identifier of the task of the task data at the top of the current stack includes the identifier of the target worker, moving to a next stack.

14. The task multi-assignment method of claim 13, wherein the assigning the task of the project and requesting to perform the task includes, when the temporary key including the identifier of the task of the task data at the top of the first stack includes the identifier of the target worker, moving to the queue.

15. The task multi-assignment method of claim 7, wherein the reassigning the task of the project and requesting to perform the task includes, when the one or more pieces of rejection data of the rejection tier storage do not include the identifier of the target worker, reassigning a task of the project to the target worker and requesting the target worker to perform the task, by using the reassignment tier storage.

16. The multi-assignment method of claim 15, wherein the assigning the task of the project and requesting to perform the task includes, when the reassignment data dequeued from the current queue of the reassignment tier storage includes the identifier of the target worker, assigning a task of the project to the target worker and requesting the target worker to perform the task, by using the assignment tier storage.

17. A non-transitory computer program stored in a computer-readable recording medium to be combined with a computer to execute a task assignment method using a tier data structure of a crowdsourcing-based project (hereinafter, a project) of a multi-assignment method of duplicately assigning each task to a plurality of n different workers (wherein n is a natural number greater than 1), the computer program performs:

configuring an assignment tier storage including a queue into which task data corresponding to a task that is not assigned to the worker is enqueued, and one or more $j^{th}$ stacks into which task data corresponding to tasks that are each assigned j times (wherein j is a natural number less than n) is pushed; and assigning a task of the project to a worker (hereinafter, a target worker) who requests task assignment and requesting the target worker to perform the task, by using the assignment tier storage;

configuring a rejection tier storage including one or more pieces of rejection data corresponding to a worker who has a work result (hereinafter, a rejected work result) that is rejected according to an inspection result; and, when the target worker has the rejected work result, requesting the target worker to perform rework by using the rejection tier storage, wherein the task data includes a key-value pair including an identifier of the task and n pieces of multi-assignment data, the multi-assignment data includes a key-value pair including an identifier of a worker to which the task is assigned, and a multi-assignment index, the assigning the task of the project and requesting to perform the task includes extracting task data at the top of a current stack in a descending order with respect to the one or more $j^{th}$ stacks, identifying whether or not the task data at the top of the current stack includes an identifier of the target worker, when the task data at the top of the current stack does not include the identifier of the target worker, popping the task data from the current stack, assigning a task corresponding to the task data popped from the current stack to the target worker, requesting the target worker to perform the task, inputting the identifier of the target worker into the multi-assignment data of the task data popped from the current stack, and pushing the task data popped from the current stack into a previous stack, the rejection data includes a key-value pair including an identifier of a worker who has the rejected work result, and a rejection task queue, an identifier of a task corresponding to the rejected work result is enqueued into the rejection task queue, the requesting to perform the rework includes, when a rejected work result occurs, enqueuing an identifier of a task corresponding to the rejected work result into a rejection task queue corresponding to a worker who inputs the rejected work result, identifying whether or not the one or more pieces of rejection data of the rejection tier storage include the identifier of the target worker, and when the one or more pieces of rejection data of the rejection tier storage include the identifier of the target worker, dequeuing an identifier of a task corresponding to the rejected work result from a rejection task queue corresponding to the target worker, and requesting the target worker to perform rework for a task corresponding to the dequeued identifier of the task.

* * * * *